US008466600B2

(12) United States Patent
Naruse et al.

(10) Patent No.: US 8,466,600 B2
(45) Date of Patent: Jun. 18, 2013

(54) ELECTROSTATIC OPERATION DEVICE

(75) Inventors: Yohko Naruse, Ichinomiya (JP);
Yoshinori Shishida, Yoro-gun (JP);
Naoteru Matsubara, Ichinomiya (JP);
Kazunari Honma, Ogaki (JP); Eiji Yuasa, Ora-gun (JP)

(73) Assignee: Sanyo Electric Co., Ltd., Moriguchi-Shi, Osaka (JP)

( * ) Notice: Subject to any disclaimer, the term of this patent is extended or adjusted under 35 U.S.C. 154(b) by 0 days.

(21) Appl. No.: 13/464,741

(22) Filed: May 4, 2012

(65) Prior Publication Data
US 2012/0217842 A1 Aug. 30, 2012

Related U.S. Application Data

(62) Division of application No. 12/439,528, filed as application No. PCT/JP2007/064945 on Jul. 31, 2007, now abandoned.

(30) Foreign Application Priority Data

Aug. 31, 2006 (JP) .................................. 2006-234811

(51) Int. Cl.
*H02N 1/00* (2006.01)
(52) U.S. Cl.
USPC ........................................................ 310/309
(58) Field of Classification Search
USPC ........................................................ 310/309
See application file for complete search history.

(56) References Cited

U.S. PATENT DOCUMENTS

| 3,696,258 | A | | 10/1972 | Anderson et al. |
| 4,205,242 | A | | 5/1980 | Micheron et al. |
| 4,247,796 | A | | 1/1981 | Fiorentino et al. |
| 4,754,185 | A | | 6/1988 | Gabriel et al. |
| 4,910,840 | A | * | 3/1990 | Sprenkels et al. ........... 29/25.41 |
| 5,367,429 | A | | 11/1994 | Tsuchitani et al. |
| 5,378,954 | A | | 1/1995 | Higuchi et al. |
| 6,833,687 | B2 | * | 12/2004 | Landolt ........................ 320/166 |
| 7,446,450 | B2 | | 11/2008 | Boland et al. |
| 7,449,811 | B2 | | 11/2008 | Suzuki et al. |
| 7,649,302 | B2 | | 1/2010 | Murayama et al. |

(Continued)

FOREIGN PATENT DOCUMENTS

| JP | 62-297779 A | 12/1987 |
| JP | 62-136982 A | 6/1988 |

(Continued)

OTHER PUBLICATIONS

Machine translation of Ichiya et al., JP 07014490, Jan. 17, 1995, "electrostatic actuating relay".*

(Continued)

*Primary Examiner* — Tran Nguyen
*Assistant Examiner* — Eric Johnson
(74) *Attorney, Agent, or Firm* — Ditthavong Mori & Steiner, P.C.

(57) ABSTRACT

An electrostatic operation device in which a variation in the amount of electric charges accumulated in an electret film caused by physical impact can be suppressed. The electrostatic operation device (electrostatic induction power generating device (1)) comprises movable electrodes (8), an electret film (5) so formed as to face the movable electrodes (8) at a space therebetween, and a stopper (401b) for suppressing the approach of the movable electrodes (8) to the electret film (5) within a predetermined space.

6 Claims, 27 Drawing Sheets

U.S. PATENT DOCUMENTS

| | | | |
|---|---|---|---|
| 7,804,205 B2 | 9/2010 | Murayama et al. | |
| 7,956,497 B2 | 6/2011 | Murayama et al. | |
| 8,053,948 B2 | 11/2011 | Suzuki et al. | |
| 8,164,231 B2* | 4/2012 | Mabuchi | 310/309 |
| 2004/0007877 A1* | 1/2004 | Boland et al. | 290/1 R |
| 2004/0016120 A1 | 1/2004 | Boland et al. | |
| 2006/0006759 A1 | 1/2006 | Matsuki | |
| 2006/0077762 A1 | 4/2006 | Boland et al. | |
| 2006/0113862 A1* | 6/2006 | Suzuki et al. | 310/309 |
| 2009/0051242 A1 | 2/2009 | Suzuki et al. | |
| 2010/0019616 A1* | 1/2010 | Naruse et al. | 310/300 |

FOREIGN PATENT DOCUMENTS

| | | | |
|---|---|---|---|
| JP | 63-136982 A | | 6/1988 |
| JP | 4-112683 A | | 4/1992 |
| JP | 07014490 | * | 1/1995 |
| JP | 2005-529574 A | | 9/2005 |
| JP | 2006-180450 A | | 7/2006 |
| WO | WO 03/105167 A2 | | 12/2003 |
| WO | WO 03/105305 A2 | | 12/2003 |

OTHER PUBLICATIONS

International Search Report for PCT Application No. PCT/JP2007/064945 dated Sep. 4, 2007, pp. 1-4.

Tsutsumino, Takumi et al., High-Performance Polymer Electret for Micro Seismic Generator, The Fifth International Workshop on Micro and Nanotechnology for Power Generation and Energy Conversion Applications, Nov. 28, 2005 to Nov. 30, 2005, 4 P, Department of Mechanical Engineering, The University of Tokyo, Tokyo, Japan.

Written Opinion for PCT Application No. PCT/JP2007/064945 dated Feb. 28, 2009, pp. 1-4.

* cited by examiner

ELECTROSTATIC OPERATION DEVICE

CROSS REFERENCE TO RELATED APPLICATIONS

This application is a divisional of U.S. application Ser. No. 12/439,528, filed Feb. 28, 2009, which is the U.S. National Stage Application of International PCT Application Number PCT/JP2007/064945, filed Jul. 31, 2007, and claims priority of Japanese Application Number 2006-234811, filed Aug. 31, 2006, the entireties of which are incorporated herein by reference.

TECHNICAL FIELD

The present invention relates to an electrostatic operation device, and more particularly, it relates to an electrostatic operation device comprising an electret film.

BACKGROUND ART

Japanese National Patent Publication Gazette No. 2005-529574 discloses an electrostatic operation device (electrostatic induction power generating device) comprising an electret film is known. This electrostatic induction power generating device disclosed in Japanese National Patent Publication Gazette No. 2005-529574 is constituted by a movable electrode, a fixed electrode and an electret film made of a charge holding material of a resin material such as Teflon (registered trademark) formed on the fixed electrode. In this electrostatic induction power generating device, the movable electrode repeatedly vibrates by receiving inertial force, so that electric charges induced in the movable electrode with electric charges stored in the electret film are changed to output the changed amount of electric charges as a current.

In the aforementioned electrostatic induction power generating device employing the electret film, however, the electrostatic induction power generating device receives a physical impact and the movable electrode and the electret film come into physical contact with each other, whereby the amount of electric charges stored in the electret film is disadvantageously changed.

DISCLOSURE OF THE INVENTION

The present invention has been proposed in order to solve the aforementioned problems, and an object of the present invention is to provide an electrostatic operation device capable of inhibiting the amount of electric charges stored in an electret film from change due to a physical impact.

An electrostatic operation device according to a first aspect of the present invention comprises a first electrode, an electret film so formed as to be opposed to the first electrode at an interval therebetween and a member inhibiting the first electrode and the electret film from moving close to each other within a prescribed interval.

As hereinabove described, this electrostatic operation device according to the first aspect comprises the member inhibiting the first electrode and the electret film from moving close to each other within the prescribed interval, whereby the first electrode and the electret film can be inhibited from coming into contact with each other due to a physical impact, and hence the amount of electric charges stored in the electret film can be inhibited from change due to contact between the first electrode and the electret film.

The aforementioned electrostatic operation device according to the first aspect preferably further comprises a second electrode so provided as to be opposed to the first electrode at an interval therebetween. According to this structure, the first electrode and the second electrode are electrically connected to each other, whereby electrostatic induction is caused in the first electrode and the second electrode by electric charges stored in the electret film. This potential difference between the first electrode and the second electrode is extracted, whereby power can be generated.

In this case, an end of a surface of the member on a side of one of the first electrode and the second electrode is preferably chamfered. According to this structure, the end of the surface of the member on the side of the first electrode has a smooth shape, and hence the first electrode can be inhibited from catching the member when the first electrode is moving by vibration.

The aforementioned electrostatic operation device comprising the first electrode and the second electrode preferably further comprises a first substrate formed with the first electrode and a second substrate formed with the second electrode, wherein the member is preferably formed on a surface of one of the first substrate and the second substrate. According to this structure, the first and second electrodes and the electret film can be easily inhibited from coming into contact with each other.

The aforementioned electrostatic operation device comprising the first electrode and the second electrode preferably further comprises a first substrate formed with the first electrode, wherein the member may be provided on a position between the first substrate and the second electrode at intervals from the first substrate and the second electrode.

The aforementioned electrostatic operation device comprising the first electrode and the second electrode preferably further comprises a protective film formed to cover a surface not formed with the electret film in the surfaces of the first and second electrodes. According to this structure, the protective film can inhibit the surface not formed with the electret film in the surfaces of the first and second electrodes from coming into contact with the electret film.

In the aforementioned electrostatic operation device according to the first aspect, the member preferably has a function as a stopper inhibiting the first electrode and the electret film from coming into contact with each other or a spacer keeping an interval between the first electrode and the electret film constant. According to this structure, the member is employed as the stopper, whereby the first electrode and the electret film can be easily inhibited from coming into contact with each other. Further, the member is employed as the spacer, whereby the interval between the first electrode and the electret film can be kept constant.

The aforementioned electrostatic operation device according to the first aspect preferably further comprises a guard electrode for inhibiting a component other than a component in a direction perpendicular to a main surface of the electret film in an electric field resulting from electric charges stored in the electret film from generation, provided to be adjacent to the electret film. According to this structure, the electric field can be inhibited from reaching a position not opposed to the main surface of the electret film and hence difference in potentials between a potential at a position opposed to the main surface of the electret film and a potential at the position not opposed to the electret film can be increased. Thus, difference between the amount of electric charges stored in the first electrode by electrostatic induction in a case where the first electrode is at the position opposed to the electret film and the amount of electric charges stored in the first electrode by electrostatic induction in a case where the first electrode is at the position not opposed to the electret film can be increased. Consequently, the amount of power generation can be increased.

In this case, the electrostatic operation device preferably further comprises a second electrode so provided as to be opposed to the first electrode at an interval therebetween, wherein the member is so formed as to be stacked on a surface of the guard electrode on a side of one of the first electrode and the second electrode. According to this structure, a planar region on the surface of the fixed substrate for arranging the member and the guard electrode is reduced as compared with a case where the member and the guard electrode are arranged on different planar positions without being stacked with each other, and hence size in the electrostatic operation device can be reduced.

In the aforementioned electrostatic operation device according to the first aspect, the member inhibiting the first electrode and the electret film from coming into contact with each other preferably functions as a guard electrode for inhibiting a component other than a component in a direction perpendicular to a main surface of the electret film in an electric field resulting from electric charges stored in the electret film from generation, provided to be adjacent to the electret film. According to this structure, the member inhibiting the first electrode and the electret film from coming into contact with each other functions also as the guard electrode and hence the number of components can be reduced dissimilarly to a case where the member and the guard electrode are separately formed.

The aforementioned electrostatic operation device according to the first aspect preferably further comprises a first substrate formed with the first electrode, wherein the first electrode is embedded in the first substrate. According to this structure, the surface of the first substrate has no irregularities and hence the first electrode can be inhibited from coming into contact with and catching the member when the first electrode is moving by vibration.

In the aforementioned electrostatic operation device according to the first aspect, the member is preferably formed between the electret film and the first electrode. According to this structure, the electret film and the first electrode can be easily inhibited from coming into contact with each other and the interval between the electret film and the first electrode can be kept at a prescribed interval or more.

The aforementioned electrostatic operation device according to the first aspect further may comprise a first substrate formed with the first electrode, wherein the first substrate may be supported by the member to be able to vibrate.

The aforementioned electrostatic operation device according to the first aspect further may comprise a second substrate formed with the electret film, wherein the second substrate may be supported by the member to be able to vibrate.

The aforementioned electrostatic operation device according to the first aspect preferably further comprises a groove shaped recess portion and a projecting portion provided on a surface of one of said first electrode and said second electrode, wherein the electret film is preferably so formed as to be embedded in at least a bottom surface of the recess portion. According to this structure, the projecting portion can inhibit the other of the first and second electrodes and the electret film from coming into contact with each other, and hence the amount of electric charges stored in the electret film can be inhibited from change.

In this case, the groove shaped recess portion is so formed that a width is preferably increased from a bottom surface of the recess portion toward an open upper end thereof. According to this structure, side surfaces of the recess portion are inclined and hence the other of the first electrode and the second electrode can be inhibited from catching the side surfaces of the recess portion.

In the aforementioned electrostatic operation device where the electret film is so formed as to be embedded in at least the bottom surface of the recess portion, a conductive layer is preferably formed on a surface of the projecting portion. According to this structure, the conductive layer can inhibit a component other than a component in a direction perpendicular to a main surface of the electret film in an electric field resulting from electric charges stored in the electret film from generation, and hence the electric field can be inhibited from reaching a position not opposed to the main surface of the electret film. Thus, difference between a potential of a position opposed to the main surface of the electret film and a potential of the position not opposed to the electret film can be increased, and hence difference between the amount of electric charges stored in the other of the first electrode and the second electrode by electrostatic induction in a case where the other of the first electrode and the second electrode is at the position opposed to the electret film and the amount of electric charges stored in the other of the first electrode and the second electrode by electrostatic induction in a case where the other of the first electrode and the second electrode is at the position not opposed to the electret film can be increased. Consequently, the amount of power generation can be increased.

In the aforementioned electrostatic operation device where the electret film is so formed as to be embedded in at least the bottom surface of the recess portion, an insulating film having a smaller breakdown voltage than the electret film is preferably formed on a surface of the projecting portion. According to this structure, even when the electret film and the insulating film are simultaneously made electret, the insulating film first causes dielectric breakdown due to the smaller breakdown voltage of the insulating film than the electret film, and hence the electret film can store a larger number of electric charges and the amounts of electric charges stored in the electret film and the insulating film are made different from each other. Thus, an intensity of an electric field on a surface of the electret film and an intensity of an electric field on a surface of the insulating film can be made different from each other.

In the aforementioned electrostatic operation device where the electret film is so formed as to be embedded in at least the bottom surface of the recess portion, the electret film is preferably formed on the bottom surface of the recess portion to have a thickness smaller than a depth of the recess portion. According to this structure, the electret film does not protrude from an opening of the recess portion and hence the electret film and the other of the first electrode and the second electrode can be inhibited from coming into contact with each other.

In the aforementioned electrostatic operation device where the electret film is so formed as to be embedded in at least the bottom surface of the recess portion, an end of a surface of the projecting portion on a side of one of the first electrode and the second electrode is preferably formed in a rounded shape or a chamfered shape. According to this structure, the projecting portion and the other of the first electrode and the second electrode can be easily inhibited from coming into contact with each other.

In the aforementioned electrostatic operation device where the electret film is so formed as to be embedded in at least the bottom surface of the recess portion, a charge outflow inhibition film is preferably formed on a surface of the electret film. According to this structure, electric charges can be easily inhibited from flowing out of the electret film.

In the aforementioned electrostatic operation device where the electret film is so formed as to be embedded in at least the bottom surface of the recess portion, the electret film formed to be embedded in the groove shaped recess portion is preferably oblongly formed in plan view. According to this structure, an intensity of an electric field on a surface of the electret film and an intensity of an electric field on a surface of a region not formed with the electret film can be easily made different from each other.

In the aforementioned electrostatic operation device according to the first aspect, the member is preferably formed on a surface of the electret film. According to this structure, a width of the electrostatic operation device can be reduced by a width of the member dissimilarly to a case where the member is formed around the electret film.

In this case, at least a part of the member is preferably formed by a member softer than the electret film. According to this structure, the member is deformed to absorb an impact even when an impact is applied to the member, and hence deformation of the electret film can be suppressed. Further, the member is formed by an elastic member, whereby the member can be inhibited from breakage even when an impact is applied to the member, and hence reduction in a surface potential resulting from deposition of fragments of the member caused by breakage on the surface of the electret film can be suppressed. The fragments of the member are deposited on the surface of the electret film, whereby an electric field on the surface of the electret film can be inhibited from hindering.

The aforementioned electrostatic operation device where the member is formed on the surface of the electret film preferably further comprises a conductive layer formed on a surface of the member. According to this structure, injection of electric charges into the member can be suppressed by the conductive layer when electric charges are injected into the electret film by corona discharge.

In the aforementioned electrostatic operation device where the member is formed on the surface of the electret film, the member is preferably so formed that a width is reduced toward a side on which the electret film is not formed. According to this structure, friction between the other of the first and second electrodes and the member can be reduced when the other of the first electrode and the second electrode comes into contact with the member dissimilarly to a case where the width of the member does not vary.

An electrostatic operation device according to a second aspect of the present invention comprises a first electrode, a second electrode provided to be adjacent to the first electrode at an interval therebetween, an electret film formed to be opposed to the first electrode and the second electrode and a member having a function as a stopper inhibiting the first and second electrodes and the electret film from coming into contact with each other or a spacer keeping an interval between the first and second electrodes and the electret film constant, between the first and second electrodes and the electret film.

As hereinabove described, this electrostatic operation device according to the second aspect comprises the member as the stopper inhibiting the first and second electrodes and the electret film from coming into contact with each other, whereby the first and second electrodes and the electret film can be inhibited from coming into contact with each other due to a physical impact, and hence the amount of electric charges stored in the electret film can be inhibited from change due to contact between the first and second electrodes and the electret film. Further, the electrostatic operation device comprises the member as the spacer keeping the interval between the first and second electrodes and the electret film constant, whereby the interval between the first and second electrodes and the electret film can be kept constant and hence the amount of power generation can be stabilized.

An electrostatic operation device according to a third aspect of the present invention comprises a first electrode, a second electrode provided to be adjacent to the first electrode at an interval therebetween, a substrate to be opposed to the first electrode and the second electrode and provided with a projecting portion and a recess portion, and an electret film formed to be embedded in a bottom surface of the recess portion provided on the substrate, wherein the projecting portion provided on the substrate has a function as a stopper inhibiting the first and second electrodes and the electret film from coming into contact with each other or a spacer keeping an interval between the first and second electrodes and the electret film constant.

In this electrostatic operation device according to the third aspect, as hereinabove described, the projecting portion of the substrate has the function as the stopper to inhibit the first and second electrodes and the electret film from coming into contact with each other, whereby the first and second electrodes and the electret film can be inhibited from coming into contact with each other due to a physical impact, and hence the amount of electric charges stored in the electret film can be inhibited from change due to contact between the first and second electrodes and the electret film. The projecting portion of the substrate has the function as the spacer keeping the interval between the first and second electrodes and the electret film constant, whereby the interval between the first and second electrodes and the electret film can be kept constant and hence the amount of power generation can be stabilized.

BEST MODES FOR CARRYING OUT THE INVENTION

Embodiments of the present invention will be hereinafter described with reference to the drawings.

First Embodiment

Figure 2:
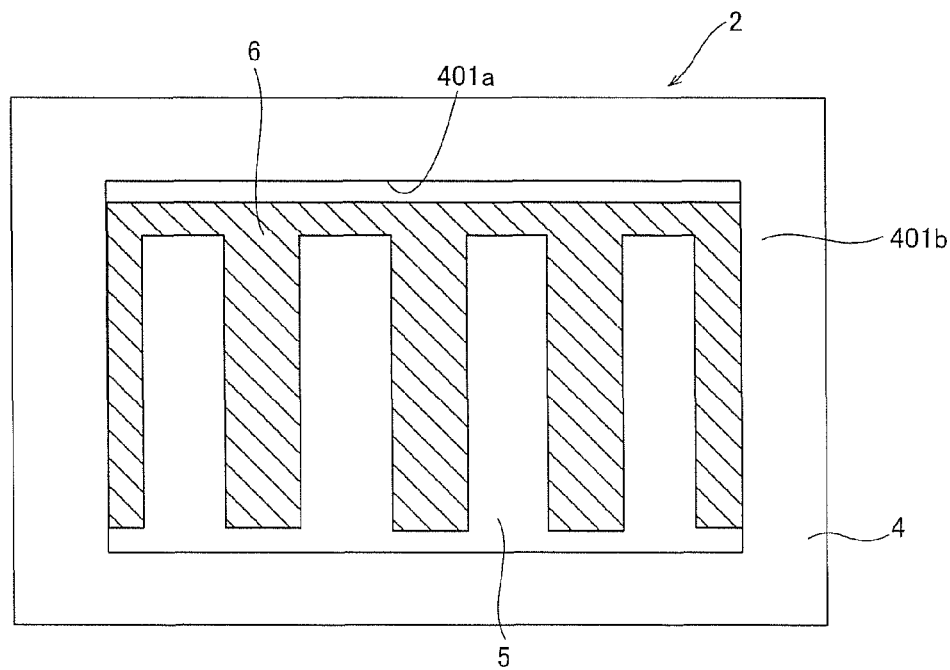
FIG. 2 A sectional view taken along the line 100-100 in FIG. 1.
Figure 3:
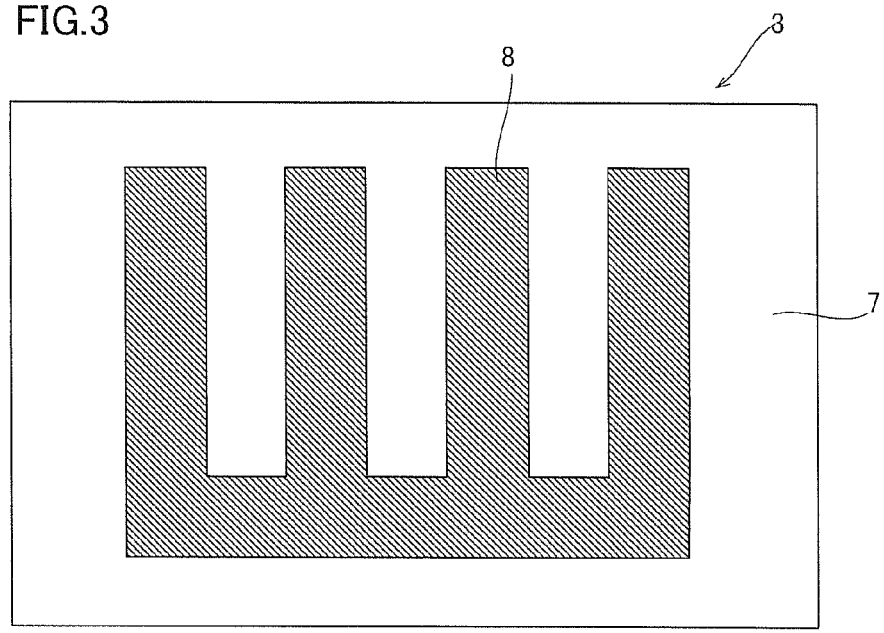
FIG. 3 A sectional view taken along the line 110-110 in FIG. 1.

A structure of an electrostatic induction power generating device 1 according to a first embodiment will be described with reference to FIGS. 1 to 3. The first embodiment of the present invention is applied to the electrostatic induction power generating device 1 employed as an exemplary electrostatic operation device.

Figure 1:
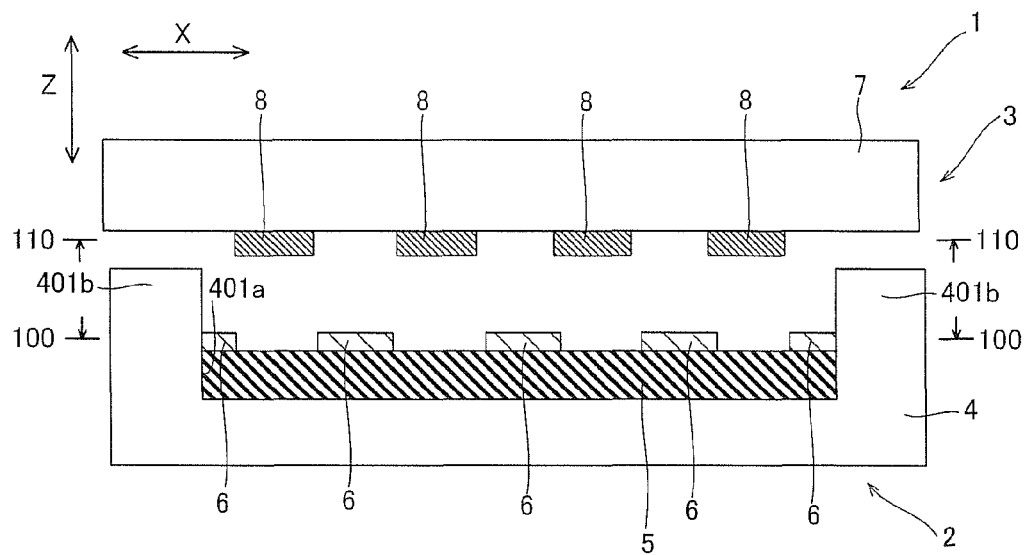
FIG. 1 A sectional view of an electrostatic induction power generating device according to a first embodiment of the present invention.

The electrostatic induction power generating device 1 according to the first embodiment is constituted by a fixed electrode portion 2 and a movable electrode portion 3, as shown in FIG. 1. The first embodiment will be now described in detail.

As shown in FIG. 1, in the fixed electrode portion 2, a groove shaped recess portion 401a and a projecting portion 401b for inhibiting an electret film 5 and a movable electrode 8, described later, from coming into contact with each other are formed on a surface of a fixed electrode 4 made of silicon. The fixed electrode 4 is an example of the "second electrode" in the present invention. The projecting portion 401b is an example of the "member" in the present invention. According to the first embodiment, the projecting portion 401b has a function as a stopper inhibiting the movable electrode 8 and the electret film 5 from coming into contact with each other. As shown in FIG. 2, the groove shaped recess portion 401a is rectangularly formed. The rectangular electret film 5 made of an organic material such as PTFE or a silicon oxide film, having a thickness of about 0.1 μm to about 50 μm is so formed as to fill up a bottom surface of the groove shaped recess portion 401a. The interdigital conductive layer 6 is formed on an upper surface of the electret film 5.

As shown in FIG. 1, in the movable electrode portion 3, the movable electrode 8 is so formed on a surface of a movable substrate 7 made of quartz as to be opposed to the electret film 5. The movable electrode 8 is an example of the "first electrode" in the present invention. As shown in FIG. 3, the movable electrode 8 is interdigitally formed.

A power generating operation of the electrostatic induction power generating device 1 according to the first embodiment of the present invention will be now described with reference to FIG. 1.

When no vibration is applied to the electrostatic induction power generating device 1, the electret film 5 and the movable electrode 8 are arranged to be opposed to each other at a prescribed interval, as shown in FIG. 1. At this time, positive electric charges or negative electric charges are stored in the surface of the electret film 5. Charges opposite to the electric charges stored in the electret film 5 on a side of the movable electrode 8 are induced in the movable electrode 8 by electrostatic induction.

Then, the movable electrode 8 moves to a position opposed to the conductive layer 6 from a position opposed to the electret film 5 shown in FIG. 1 by applying horizontal vibration (in a direction X) to the electrostatic induction power generating device 1 and moving the movable electrode 8 in the direction X. Thus, electrostatic force running to the movable electrode 8 is reduced, and hence the amount of electric charges induced in the movable electrode 8 is reduced. Thereafter the electrostatic induction power generating device 1 vibrates in the horizontal direction (direction X), so that the amount of the electric charges induced in the movable electrode 8 is increased when the electret film 5 and the movable electrode 8 are at the opposed position shown in FIG. 1. This changed amount of the electric charges induced in the movable electrode 8 is extracted as a current, so that the electrostatic induction power generating device 1 can generate power.

According to the first embodiment, as hereinabove described, the electrostatic induction power generating device 1 comprises the projecting portion 401b for inhibiting the movable electrode 8 and the electret film 5 from coming into contact with each other, whereby the movable electrode 8 can be inhibited from moving in a direction Z (vertical direction) shown in FIG. 1 by a physical impact and coming into contact with the electret film 5, and hence the amount of electric charges stored in the electret film 5 can be inhibited from change due to contact between the movable electrode 8 and the electret film 5. Further, the fixed electrode 4 and the projecting portion 401b are integrally formed, whereby adhesion between the fixed electrode 4 and the projecting portion 401b is excellent and hence the fixed electrode 4 and the projecting portion 401b can be inhibited from separation even when force by the contact between the movable electrode 8 and the electret film 5 in vibration is applied to the projecting portion 401b. Additionally, the fixed electrode 4 and the projecting portion 401b are integrally formed, whereby the number of components can be reduced dissimilarly to a case where the fixed electrode 4 and the projecting portion 401b are formed by different members.

Second Embodiment

Figure 4:
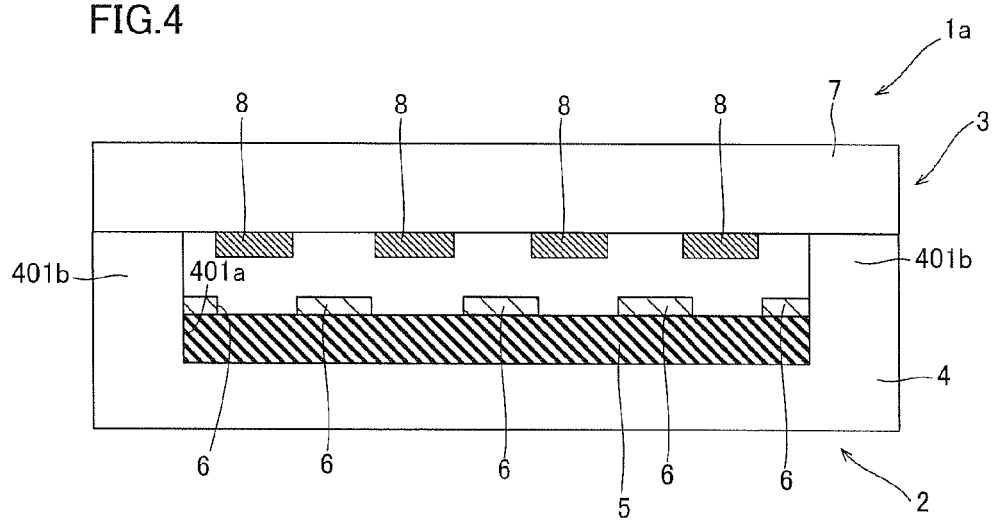
FIG. 4 A sectional view of an electrostatic induction power generating device according to a second embodiment of the present invention.

Referring to FIG. 4, an electrostatic induction power generating device 1a where a movable substrate 7 is in contact with a projecting portion 401b will be described in this second embodiment dissimilarly to the aforementioned first embodiment.

In an electrostatic induction power generating device 1a according to this second embodiment, the projecting portion 401b provided on a fixed electrode 4 is formed in contact with the movable substrate 7 as shown in FIG. 4.

According to the second embodiment, the projecting portion 401b has a function as a stopper inhibiting the movable electrode 8 and the electret film 5 from coming into contact with each other and also has a function as a spacer keeping an interval between the movable electrode 8 and the electret film 5 constant. The remaining structure of the second embodiment is similar to that of the aforementioned first embodiment.

The effects of the second embodiment are similar to those of the aforementioned first embodiment.

Third Embodiment

Figure 5:
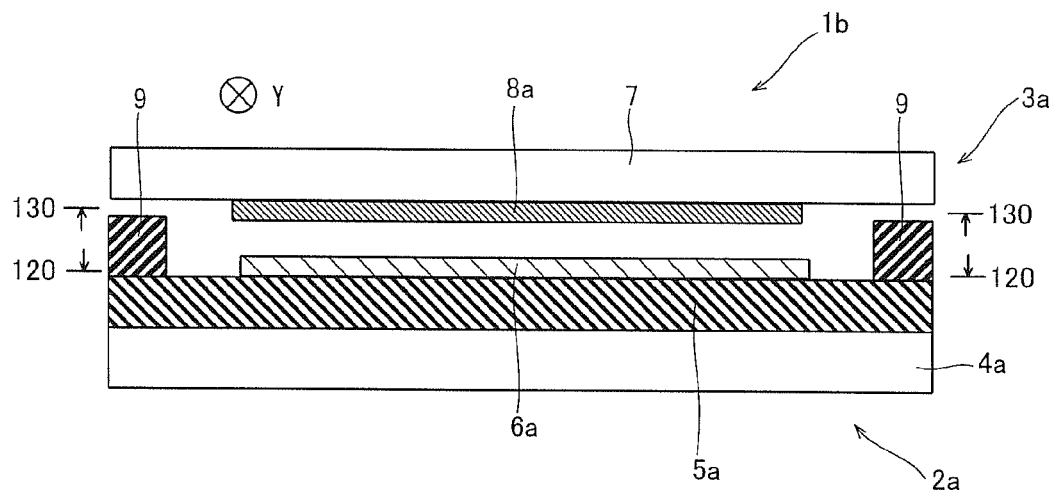
FIG. 5 A sectional view of an electrostatic induction power generating device according to a third embodiment of the present invention.
Figure 6:
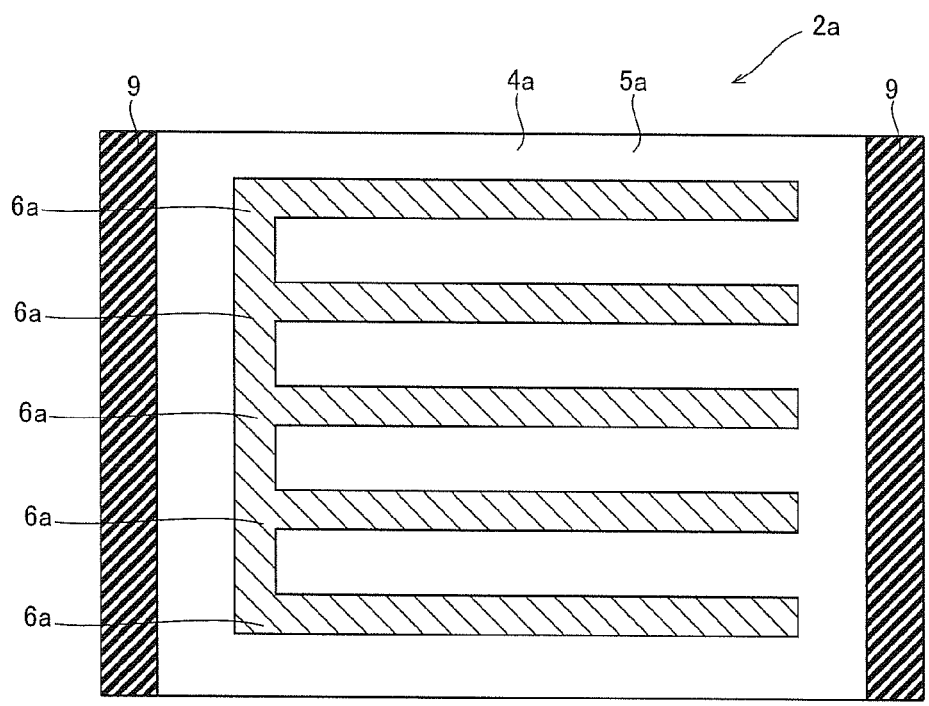
FIG. 6 A sectional view taken along the line 120-120 in FIG. 5.
Figure 7:
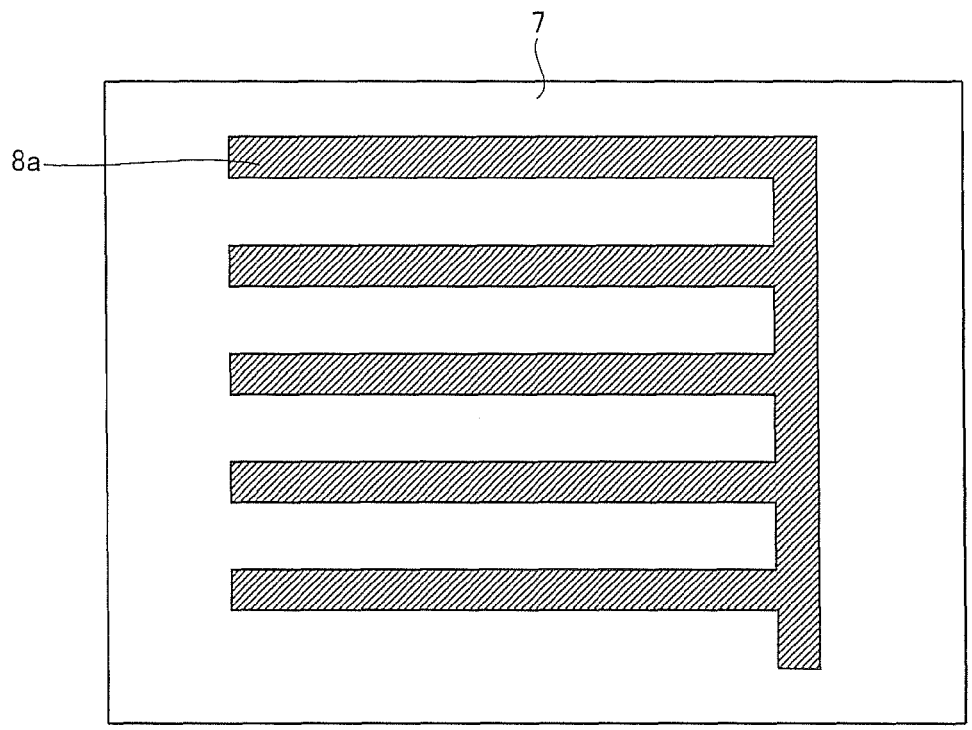
FIG. 7 A sectional view taken along the line 130-130 in FIG. 5.

Referring to FIGS. 5 to 7, an electrostatic induction power generating device 1b where stopper films 9 are formed on a surface of an electret film 5a will be described in this third embodiment dissimilar to the aforementioned first embodiment.

In a fixed electrode portion 2a according to this third embodiment, the electret film 5a is formed on a surface of a fixed electrode 4a as shown in FIG. 5. The fixed electrode 4a is an example of the "second electrode" in the present invention. As shown in FIGS. 5 and 6, oblong conductive layer 6a is formed on a surface of the electret film 5a. According to the third embodiment, the stopper films 9 formed by an insulating film such as a plasma silicon oxide film or a plasma silicon nitride film softer than the electret film 5a, a tape constituted by a substrate and an adhesive material, a conductive material and combination of these are formed to be adjacent to the conductive layer 6a. The stopper films 9 are examples of the "member" in the present invention. A height of each of the stopper films 9 is formed to be larger than that of the conductive layer 6a. A charge outflow inhibition film made of MSQ may be formed on a surface of the electret film 5a.

As shown in FIGS. 5 and 7, a movable electrode 8a is formed on a surface of a movable substrate 7. As shown in FIG. 7, the movable electrode 8a is oblongly formed.

As shown in FIG. 5, in an electrostatic induction power generating device lb according to the third embodiment, the fixed electrode 4a and the movable electrode 8a relatively move in a direction Y, thereby generating power.

According to the third embodiment, as hereinabove described, the stopper films 9 are formed on the surface of the electret film 5a, whereby a width of the electrostatic induction power generating device 1b can be reduced by a width of the stopper films 9 dissimilarly to a case of forming the stopper films 9 around the electret film 5a. The stopper films 9 are formed by the insulating film such as a plasma oxide film or a plasma nitride film softer (having a Young's modulus lower) than the electret film 5a or the tape constituted by a substrate and an adhesive material, whereby the stopper films 9 are deformed to absorb an impact even when the impact is applied to the stopper films 9, and hence deformation of the electret film 5a can be suppressed. Further, the stopper films 9 are formed by an elastic member, whereby the stopper films 9 can be inhibited from breakage even when an impact is applied to the stopper films 9, and hence reduction in a surface potential resulting from deposition of fragments of the stopper films 9 caused by breakage on the surface of the electret film 5a can be suppressed. The fragments of the stopper films 9 are deposited on the surface of the electret film 5a, whereby an electric field on the surface of the electret film 5a can be inhibited from hindering.

Fourth Embodiment

Figure 8:
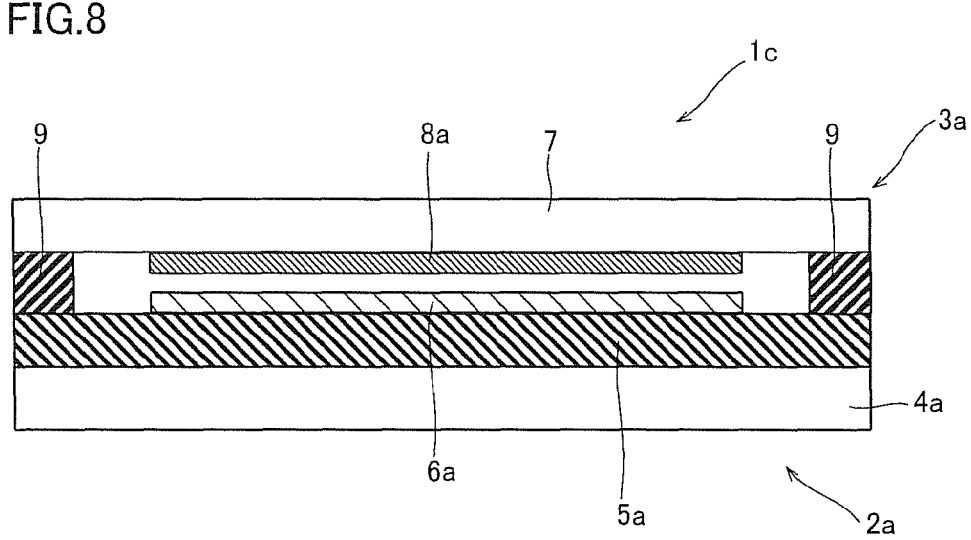
FIG. 8 A sectional view of an electrostatic induction power generating device according to a fourth embodiment of the present invention.

Referring to FIG. 8, an electrostatic induction power generating device 1c where a movable substrate 7 is in contact with stopper films 9 will be described in this fourth embodiment dissimilarly to the aforementioned third embodiment.

In an electrostatic induction power generating device 1c according to this fourth embodiment, the stopper films 9 provided on a surface of an electret film 5a are formed in contact with the movable substrate 7 as shown in FIG. 8. The remaining structure of the fourth embodiment is similar to that of the aforementioned third embodiment. The effects of the fourth embodiment are similar to those of the aforementioned third embodiment.

Fifth Embodiment

Figure 9:
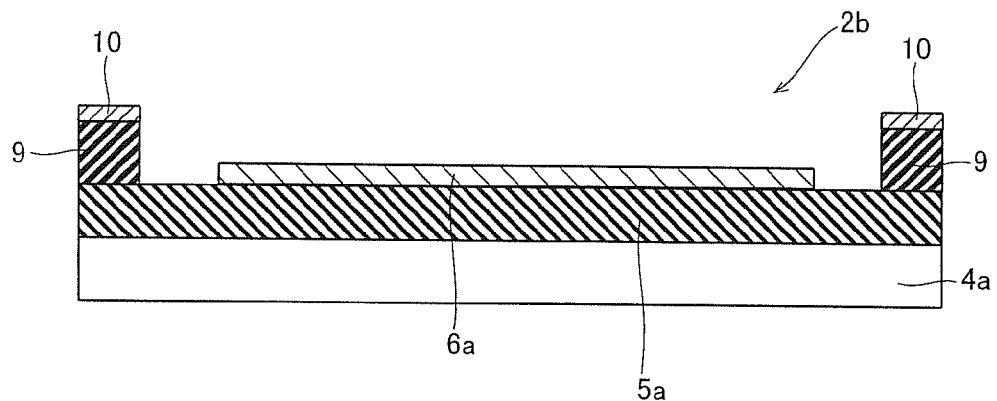
FIG. 9 A sectional view of a fixed electrode portion of an electrostatic induction power generating device according to a fifth embodiment of the present invention.

Referring to FIG. 9, a fixed electrode portion 2b where conductive layers 10 are formed on surfaces of stopper films 9 will be described in this fifth embodiment dissimilarly to the aforementioned third embodiment.

In the fixed electrode portion 2b according to this fifth embodiment, conductive layers 10 are formed on the surfaces of the stopper films 9 as shown in FIG. 9. The remaining structure of the fifth embodiment is similar to that of the aforementioned third embodiment.

According to the fifth embodiment, as hereinabove described, the conductive layers 10 are formed on the surfaces of the stopper films 9, whereby injection of electric charges into the stopper films 9 can be suppressed by the conductive layers 10 when electric charges are injected into the electret film 5a by corona discharge. Thus, electrostatic force exerted on the movable electrode 8a can be suppressed by the stopper films 9.

Sixth Embodiment

Figure 10:
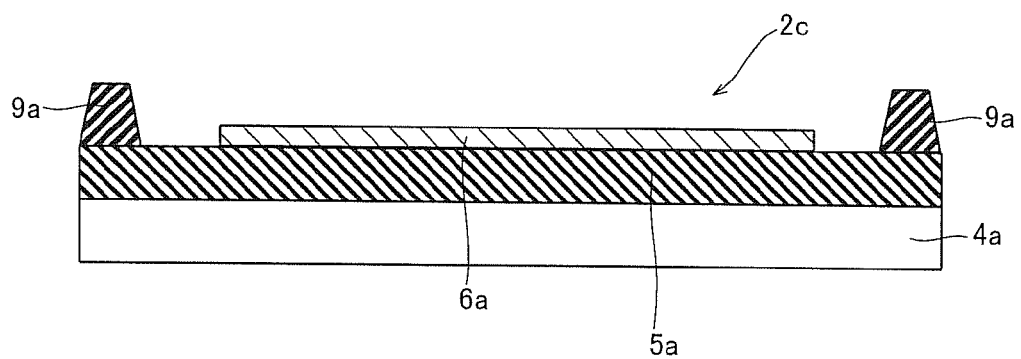
FIG. 10 A sectional view of a fixed electrode portion of an electrostatic induction power generating device according to a sixth embodiment of the present invention.

Referring to FIG. 10, a fixed electrode portion 2c where stopper films 9a are so formed that widths thereof are reduced toward a side of a movable electrode 8a will be described in this sixth embodiment dissimilarly to the aforementioned third embodiment.

In the fixed electrode portion 2c according to this sixth embodiment, the stopper films 9a are so formed that the widths thereof are reduced toward the side of the movable electrode 8a (see FIG. 5) as shown in FIG. 10. The stopper films 9a are examples of the "member" in the present invention. The remaining structure of the sixth embodiment is similar to that of the aforementioned third embodiment.

According to the sixth embodiment, as hereinabove described, the stopper films 9a are so formed that the widths thereof are reduced toward the side of the movable electrode 8a, whereby friction between the movable electrode 8a and the stopper films 9a can be reduced when the movable electrode 8a and the stopper films 9a (see FIG. 5) come into contact with each other dissimilarly to a case where the widths of the stopper films 9 do not vary.

Seventh Embodiment

Figure 11:
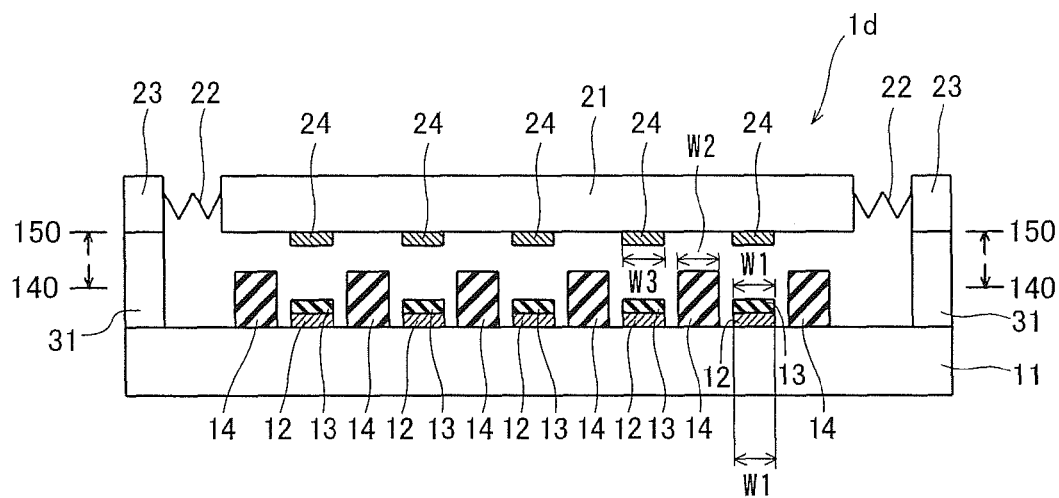
FIG. 11 A sectional view of an electrostatic induction power generating device according to a seventh embodiment of the present invention.
Figure 12:
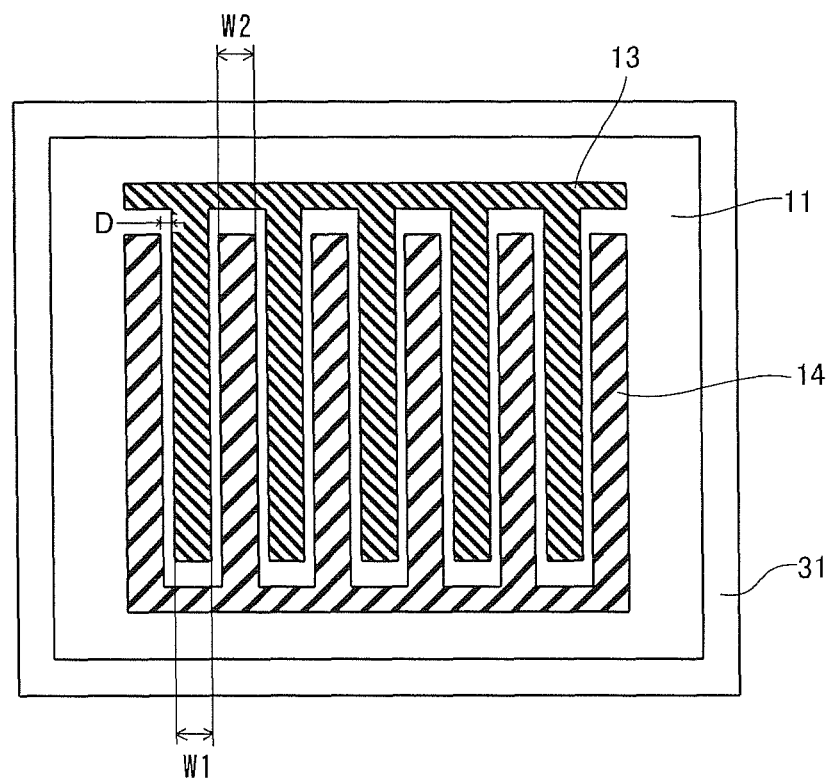
FIG. 12 A sectional view taken along the line 140-140 in FIG. 11.
Figure 13:
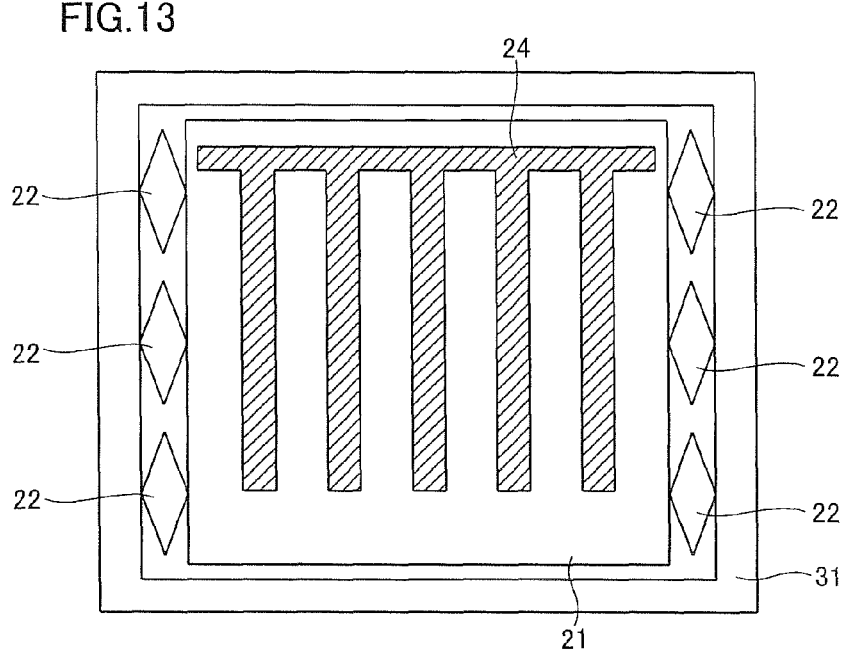
FIG. 13 A sectional view taken along the line 150-150 in FIG. 11.

Referring to FIGS. 11 to 13, a structure of an electrostatic induction power generating device 1d according to a seventh embodiment will be described.

The electrostatic induction power generating device 1d according to this seventh embodiment is constituted by a fixed substrate 11 made of glass, a movable substrate 21 made of glass and a column portion 31 made of silicon as shown in FIG. 11. The movable substrate 21 is mounted on a frame portion 23 through spring portions 22 as shown in FIG. 13. The column portion 31 is formed on an upper surface of the fixed substrate 11 and the frame portion 23 is fixed on an upper surface of the column portion 31. A detailed description will be made hereinafter.

As shown in FIGS. 11 and 12, an interdigital fixed electrode 12 made of Au or Al having a thickness of about 1 µm and a width W1 of about 100 µm is formed on the upper surface of the fixed substrate 11 made of glass having a thickness of about 0.5 mm. The fixed electrode 12 is an example of the "second electrode" in the present invention. An interdigital electret film 13 made of Teflon (registered trademark) having a thickness of about 1 µm and the width W1 of about 100 µm is so formed as to be stacked on the upper surface of the fixed electrode 12. Charges are injected by corona discharge so that the electret film 13 is controlled to a potential of about 1000 V.

According to the seventh embodiment, an interdigital stopper film 14 made of a silicon oxide film or a silicon nitride film having a thickness of about 20 µm and a width W2 of about 100 µm is formed on the upper surface of the fixed substrate 11 to be adjacent to the fixed electrode 12 at intervals D of about 10 µm from the fixed electrode 12. The stopper film 14 is an example of the "member" in the present invention. In other words, the stopper film 14 is so formed as to have a thickness not causing contact between a movable electrode 24, described later, and the electret film 13 when the movable electrode 24 comes close to the electret film 13 by vibration.

The electret film 13 and the fixed electrode 12 are opposed to the stopper film 14 at an interval so that teeth forming the interdigital electret film 13 and the interdigital fixed electrode 12 do not overlap with teeth forming the interdigital stopper film 14. The column portion 31 is formed along peripheral portions of the fixed substrate 11 and the frame portion 23.

As shown in FIG. 11, the movable electrode 24 made of Au or Al having a thickness of about 0.5 µm and a width of about 100 µm is formed on a lower surface of the movable substrate 21 made of glass having a thickness of about 0.5 mm. The movable electrode 24 is an example of the "first electrode" in the present invention. The fixed substrate 11 and the movable substrate 21 are set to be opposed at an interval of about 30 µm by the column portion 31.

As shown in FIG. 13, the movable electrode 24 is interdigitally formed similarly to the electret film 13 and the fixed electrode 12 shown in FIG. 12. As shown in FIG. 11, the electret film 13 and the movable electrode 24 are arranged to be opposed to each other when no vibration is applied to the electrostatic induction power generating device 1d.

A power generating operation of the electrostatic induction power generating device 1d according to the seventh embodiment of the present invention will be now described with reference to FIGS. 11 and 14.

When no vibration is applied to the electrostatic induction power generating device 1d, the electret film 13 and the movable electrode 24 are arranged to be opposed to each other at a prescribed interval, as shown in FIG. 11. At this time, positive electric charges or negative electric charges are stored in the surface of the electret film 13. Charges opposite to the electric charges stored in the electret film 13 on a side of the movable electrode 24 are induced in the movable electrode 24 by electrostatic induction.

Figure 14:
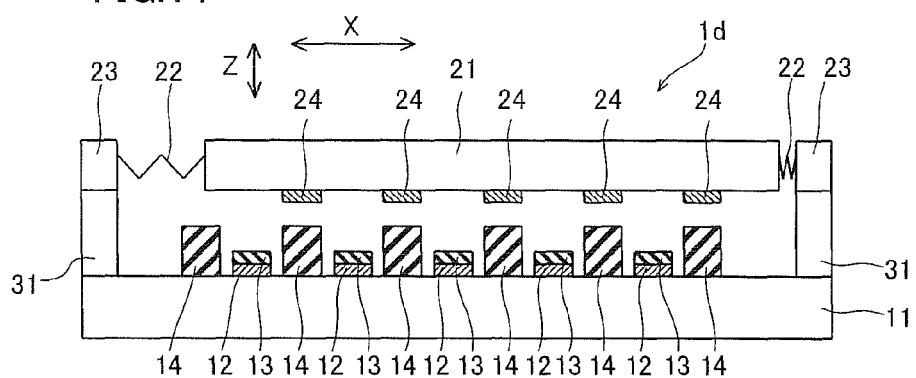
FIG. 14 A sectional view for illustrating a power generating operation of the electrostatic induction power generating device according to the seventh embodiment of the present invention.

Then, the movable electrode 24 moves to a position opposed to the stopper film 14 shown in FIG. 14 from a position opposed to the electret film 13 shown in FIG. 11 by applying horizontal vibration (in a direction X) to the electrostatic induction power generating device 1d and moving the movable electrode 24 in the direction X. The influence of an electric field resulting from electric charges stored in the electret film 13 on the movable electrode 24 is smaller at the position opposed to the stopper film 14 shown in FIG. 14 than at the position opposed to the electret film 13 shown in FIG. 11, and hence the amount of electric charges stored in the movable electrode 24 is reduced. Thereafter the movable electrode 24 is returned to a state shown in FIG. 11 by the spring portions 22, to be opposed to the electret film 13, thereby increasing the amount of electric charges stored in the movable electrode 24. Further, the movable electrode 24 moves in a direction opposite to the direction X shown in FIG. 14 by inertial force, to be opposed to the stopper film 14, thereby reducing the amount of electric charges stored in the movable electrode 24. Thus, the changed amount of electric charges stored in the movable electrode 24, induced by repeating lateral (horizontal) vibration is extracted as a alternating current by a wire (not shown) connected to the fixed electrode 12 and the movable electrode 24, thereby generating power. While FIG. 14 shows that the operating range of the movable electrode 24 is movement to the stopper film 14 adjacent to the opposed electret film 13, the movable electrode 24 may be formed to move to the stopper film 14 next to the adjacent stopper film 14.

According to the seventh embodiment, as hereinabove described, the electrostatic induction power generating device 1d comprises the stopper film 14 inhibiting the movable electrode 24 and the electret film 13 from coming into contact with each other, whereby the movable electrode 24 can be inhibited from moving in a direction Z (vertical direction) shown in FIG. 14 by a physical impact and coming into contact with the electret film 13, and hence the amount of electric charges stored in the electret film 13 can be inhibited from change due to contact between the movable electrode 24 and the electret film 13.

Eighth Embodiment

Figure 15:
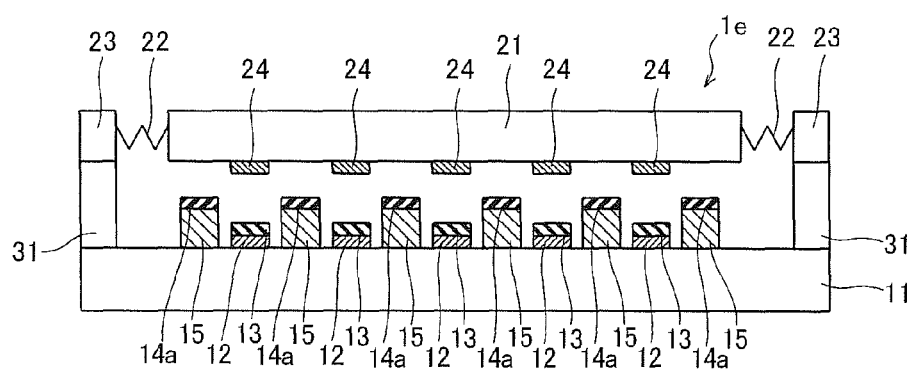
FIG. 15 A sectional view of an electrostatic induction power generating device according to an eighth embodiment of the present invention.

Referring to FIG. 15, an electrostatic induction power generating device 1e where a guard electrode 15 is formed on an upper surface of a fixed substrate 11 will be described in this eighth embodiment dissimilarly to the aforementioned seventh embodiment.

In this electrostatic induction power generating device 1e according to the eighth embodiment, the guard electrode 15 made of Cu, Au or Al having a thickness of about 20 µm and a width of about 100 µm is formed on the upper surface of the fixed substrate 11 to be adjacent to the fixed electrode 12 and an electret film 13 formed on the fixed electrode 12, as shown in FIG. 15. This guard electrode 15 has a function inhibiting components other than a component in a direction perpendicular to a main surface of the electret film 13 in an electric field resulting from electric charges stored in the electret film 13 from generation. More specifically, existence of the guard electrode 15 inhibits the electric field resulting from the electric charges stored in the electret film 13 from reaching around on the stopper film 14, and hence change in the capacitance of electric charges stored in the movable electrode 24 in changing a position of the movable electrode 24 can be increased. This point has already been confirmed by a simulation, described later, conducted by inventors of this application. A potential of the guard electrode 15 is controlled to 0 V. A stopper film 14a having a thickness of about 1 µm is formed to be stacked on an upper surface of the guard electrode 15. The stopper film 14a is an example of the "member" in the present invention. A height of an upper surface of the stopper film 14a is formed to be at least a height enough to suppress contact between the electret film 13 and the movable electrode 24 by vibration. The remaining structure of the eighth embodiment is similar to that of the seventh embodiment.

According to the eighth embodiment, as hereinabove described, the guard electrode 15 for inhibiting the components other than the component in the direction perpendicular to the main surface of the electret film 13 in the electric field resulting from the electric charges stored in the electret member 13 from generation is provided to be adjacent to the electret film 13, whereby the electric field can be inhibited from reaching a position not opposed to the main surface of the electret film 13 and hence difference in potentials between a position opposed to the main surface of the electret film 13 and the position not opposed to the electret film 13 can be increased. Thus, difference between the amount of electric charges stored in the movable electrode 24 by electrostatic induction in a case where the movable electrode 24 is at the position opposed to the electret film 13 and the amount of electric charges stored in the movable electrode 24 by electrostatic induction in a case where the movable electrode 24 is at the position not opposed to the electret film 13 can be increased. Consequently, the amount of power generation can be increased.

According to the eighth embodiment, as hereinabove described, the stopper film 14a is so formed as to be stacked on the surface of the guard electrode 15 on the side of the movable electrode 24, whereby a planar region on the upper surface of the fixed substrate 11 for arranging the stopper film 14a and the guard electrode 15 is reduced as compared with a case where the stopper film 14a and the guard electrode 15 are arranged on different planar positions without being stacked with each other, and hence size in the electrostatic induction power generating device 1e can be reduced.

The remaining effects of the eighth embodiment are similar to those of the aforementioned seventh embodiment.

Figure 16:
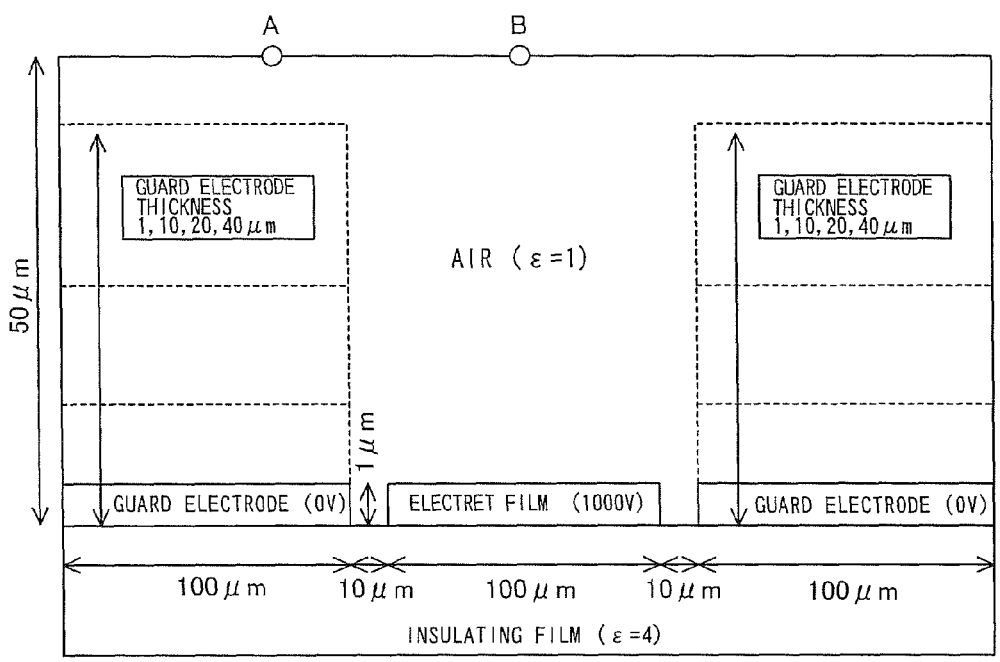
FIG. 16 A diagram showing a condition of an electromagnetical field simulation for confirming effects of guard electrodes according to the eighth embodiment.
Figure 17:
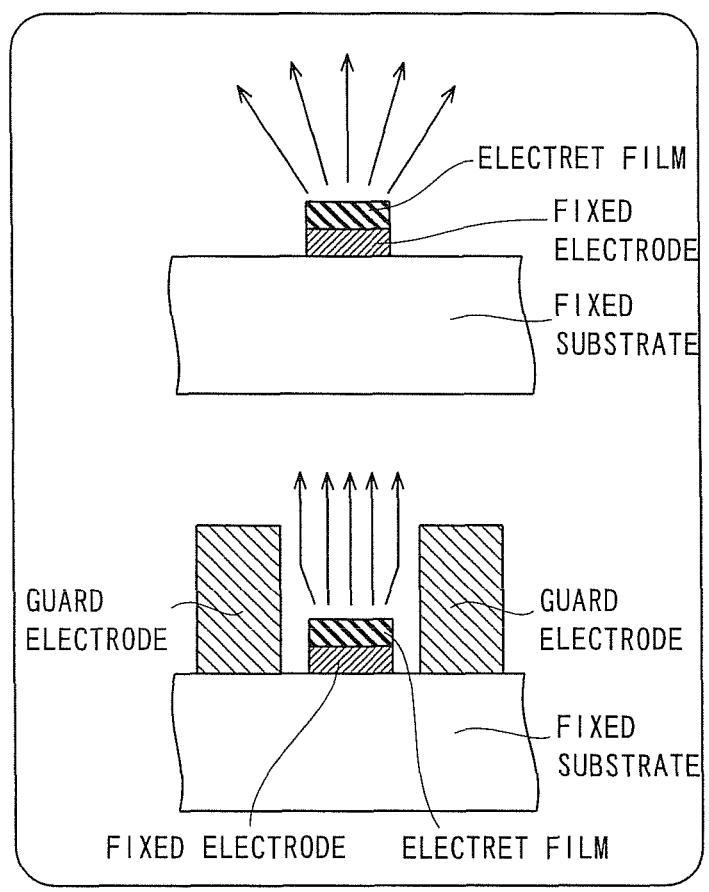
FIG. 17 A diagram showing lines of electric force by electric charges stored in the electret film.

The simulation conducted for confirming the effects of the guard electrode according to the aforementioned eighth embodiment will be now described with reference to FIGS. 16 and 17. In this simulation, it was assumed that an electret film having a thickness of 1 μm and a width of 100 μm and controlled to a potential of 1000 V was formed on an insulating film (assuming glass) having a dielectric constant c of 4, as shown in FIG. 16. Further, it was assumed that a guard electrode having a width of about 100 μm was formed to be adjacent to the electret film at an interval of 10 μm. It was assumed that four types of 1 μm, 10 μm, 20 μm and 40 μm were employed as a thickness of the guard electrode. A potential of the guard electrode is controlled to 0 V. It was assumed that air having a dielectric constant c of 1 filled up spaces between the insulating film, the electret film and the guard electrode. Then distribution of potentials on respective points by electric charges stored in the electret film was obtained by an electromagnetical field simulation. More specifically, differences in potentials between points A above the guard electrodes at the intervals from the guard electrodes and points B above the electret films at intervals from the electret films in cases where the thicknesses of the guard electrodes are 1 μm, 10 μm, 20 μm and 40 μm are obtained respectively. Table 1 shows the results of this experiment.

TABLE 1

| Thickness of Guard Electrode (μm) | Difference in Potentials between Point A and Point B (V) |
| --- | --- |
| 1 | 310 |
| 10 | 330 |
| 20 | 347 |
| 40 | 372 |

It is understood from the aforementioned Table 1 that the difference in the potentials between the point A and the point B is increased as the thickness of the guard electrode is increased. This shows that the components other than the component in the direction perpendicular to the main surface of the electret film in the electric field resulting from the electric charges stored in the electret film is inhibited from generation as the thickness of the guard electrode is increased, and the electric field is inhibited from reaching the point A. Consequently, the difference in the potentials between the point A and the point B is increased. This is conceivably for the following reason: In other words, the lines of electric force are expanded also in directions other than the direction perpendicular to the main surface of the electret film in a state where no guard electrode is formed as shown in an upper figure in FIG. 17. In the case where the guard electrode is formed as to be adjacent to the electret film, however, it is conceivable that directions of the lines of electric force are uniformed in a direction opposed to the movable electrode by the guard electrode as shown in a lower figure in FIG. 17 and hence the lines of electric force are inhibited from reaching the point A in FIG. 16. Consequently, the difference in the potentials between the point A and the point B shown in FIG. 16 is conceivably increased when the guard electrode is formed.

Ninth Embodiment

Figure 18:
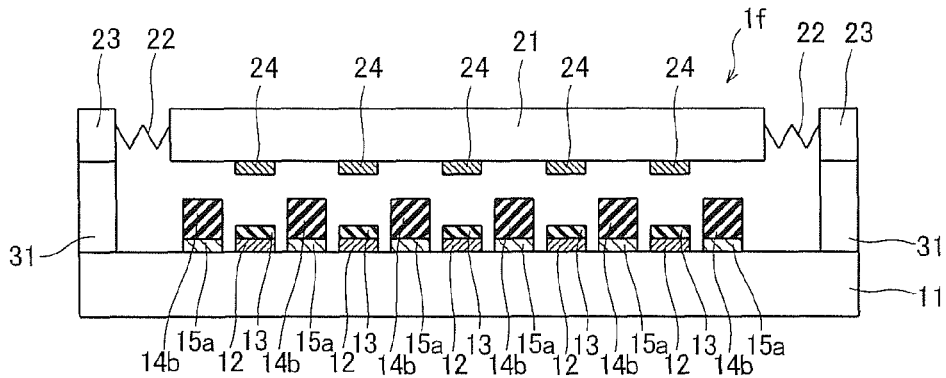
FIG. 18 A sectional view of an electrostatic induction power generating device according to a ninth embodiment of the present invention.

Referring to FIG. 18, an electrostatic induction power generating device 1f where a fixed electrode 12 and a guard electrode 15a have the same thickness and are made of the same material will be described in this ninth embodiment dissimilarly to the aforementioned eighth embodiment.

In this electrostatic induction power generating device 1f according to the ninth embodiment, the guard electrode 15a having the same thickness of about 1 μm as the fixed electrode 12 is formed on an upper surface of a fixed substrate 11 to be adjacent to the fixed electrode 12 having a thickness of about 1 μm and an electret film 13 formed on the fixed electrode 12 as shown in FIG. 18. The fixed electrode 12 and the guard electrode 15a are made of the same material (Al or Au, for example). Thus, the fixed electrode 12 and the guard electrode 15a can be simultaneously formed and hence steps of forming the electrostatic induction power generating device 1b can be reduced. A stopper film 14b having a thickness of about 20 μm is formed on an upper surface of the guard electrode 15a. The stopper film 14b is an example of the "member" in the present invention. A height of an upper surface of the stopper film 14b is formed to be a height enough to suppress contact between the electret film 13 and the movable electrode 24 by vibration. A potential of the guard electrode is controlled to 0 V. The remaining structure is similar to that of the seventh embodiment.

The effects of the ninth embodiment are similar to those of the aforementioned seventh and eighth embodiments.

Tenth Embodiment

Figure 19:
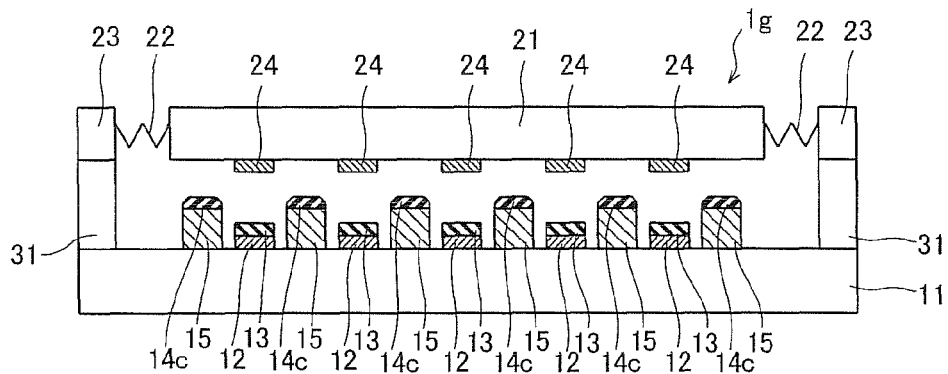
FIG. 19 A sectional view of an electrostatic induction power generating device according to a tenth embodiment of the present invention.

Referring to FIG. 19, an electrostatic induction power generating device 1g where ends of a surface of a stopper film 14c on a side of a movable electrode 24 are chamfered will be described in this tenth embodiment dissimilarly to the aforementioned eighth embodiment.

In this electrostatic induction power generating device 1g according to the tenth embodiment, a guard electrode 15 having a thickness of about 20 μm is formed on an upper surface of a fixed substrate 11 as shown in FIG. 19. The stopper film 14c having a thickness of about 1 μm is formed on an upper surface of the guard electrode 15. The stopper film 14c is an example of the "member" in the present invention. At this time, the ends of the surface of the stopper film 14c on the side of the movable electrode 24 are chamfered according to the tenth embodiment. A height of an upper surface of the stopper film 14c is formed to be a height enough to suppress contact between an electret film 13 and the movable electrode 24 by vibration. The remaining structure is similar to that of the seventh embodiment.

According to the tenth embodiment, as hereinabove described, the ends of the surface of the stopper film 14c on the side of the movable electrode 24 are chamfered, whereby the ends of the surface of the stopper film 14c on the side of the movable electrode 24 have smooth shapes and hence the stopper film 14c and the movable electrode 24 can be inhibited from coming into contact with and catching each other when the movable electrode 24 is moving by vibration.

The effects of the tenth embodiment are similar to those of the aforementioned seventh and eighth embodiments.

Eleventh Embodiment

Figure 20:
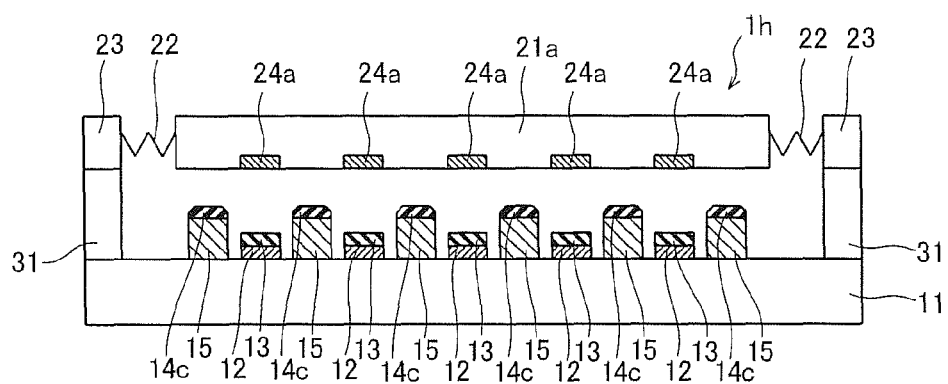
FIG. 20 A sectional view of an electrostatic induction power generating device according to an eleventh embodiment of the present invention.

Referring to FIG. 20, an electrostatic induction power generating device 1h where a movable electrode 24a is so formed as to be embedded in a movable substrate 21a will be described in this eleventh embodiment dissimilarly to the aforementioned tenth embodiment.

In this electrostatic induction power generating device 1h according to the eleventh embodiment, the movable electrode 24a is so formed as to be embedded in the movable substrate 21a as shown in FIG. 20. The movable substrate 21a is an example of the "first substrate" in the present invention. The movable electrode 24a is an example of the "first electrode" in the present invention. Thicknesses of the stopper film 14c and the guard electrode 15 are so formed that the total thickness of the stacked stopper film 14c and guard electrode 15 is larger than the total thickness of the stacked fixed electrode 12 and electret film 13. The remaining structure is similar to that of the tenth embodiment.

According to the eleventh embodiment, as hereinabove described, the movable electrode 24a is so formed as to be embedded in the movable substrate 21a, whereby the surface of the movable substrate 21a has no irregularities and hence the movable electrode 24a can be inhibited from coming into contact with and catching the stopper film 14c when the movable electrode 24a is moving by vibration.

The effects of the eleventh embodiment are similar to those of the aforementioned seventh and eighth embodiments.

Twelfth Embodiment

Figure 21:
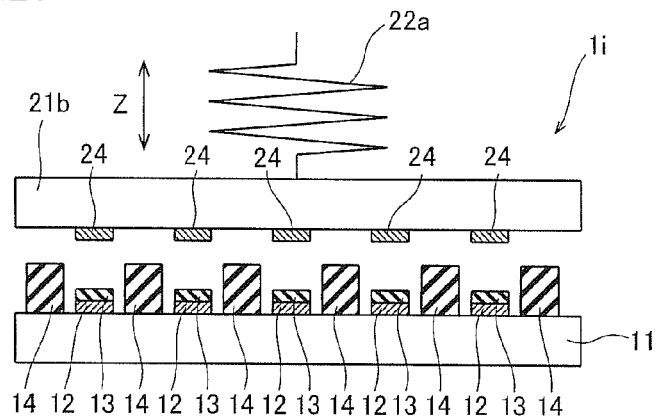
FIG. 21 A sectional view of an electrostatic induction power generating device according to a twelfth embodiment of the present invention.

Referring to FIG. 21, an electrostatic induction power generating device 1i where a movable substrate 21b vibrates in a direction Z will be described in this twelfth embodiment dissimilarly to the aforementioned seventh to eleventh embodiments.

In this electrostatic induction power generating device 1i according to the twelfth embodiment, a spring portion 22a is formed on an upper surface of the movable substrate 21b as shown in FIG. 21, and the movable substrate 21b moves in the direction Z to generate power. While an opposed area of the movable electrodes 24 and 24a and the electret film 13 is changed to generate power in the aforementioned seventh to eleventh embodiments, a distance between the movable electrode 24 and the electret film 13 is changed to generate power in the twelfth embodiment. The remaining structure is similar to that of the seventh embodiment.

The effects of the twelfth embodiment are similar to those of the aforementioned seventh embodiment.

Thirteenth Embodiment

Figure 22:
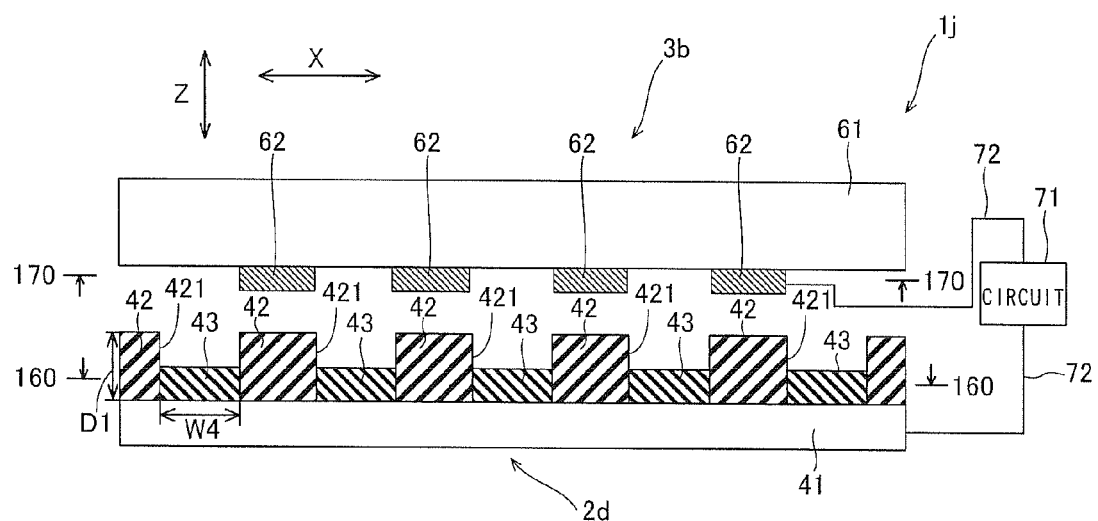
FIG. 22 A sectional view of an electrostatic induction power generating device according to a thirteenth embodiment of the present invention.
Figure 23:
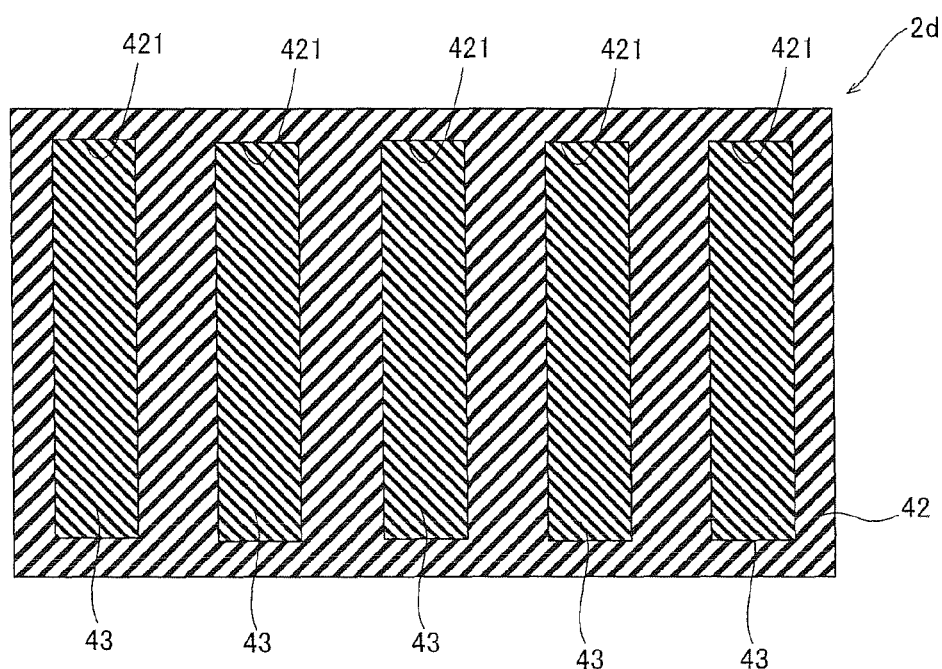
FIG. 23 A sectional view taken along the line 160-160 in FIG. 22.
Figure 24:
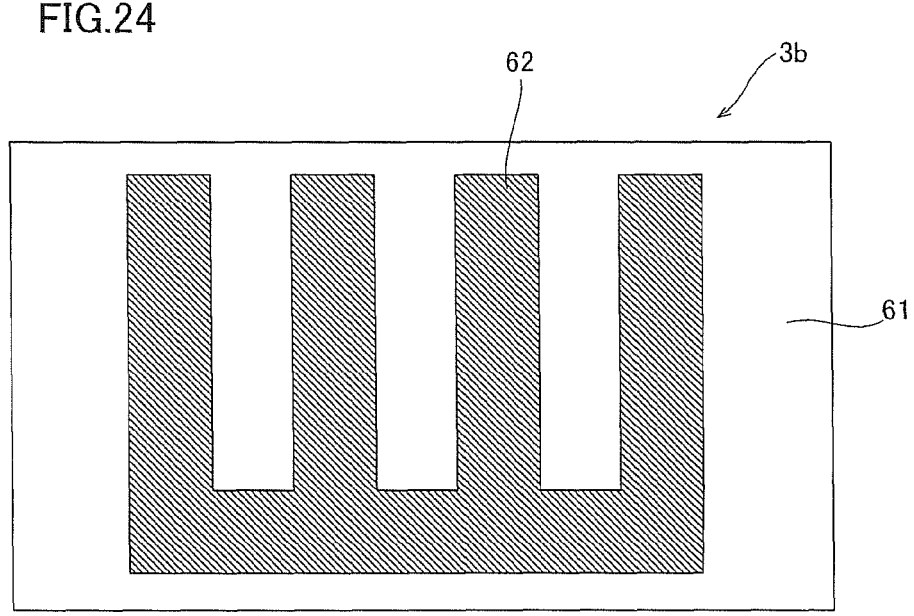
FIG. 24 A sectional view taken along the line 170-170 in FIG. 22.

Referring to FIGS. 22 to 24, an electrostatic induction power generating device 1j where an electret film 43 is so formed as to be embedded in bottom surfaces of recess portions 421 will be described in this thirteenth embodiment dissimilarly to the aforementioned first to twelfth embodiments.

This electrostatic induction power generating device 1j according to the thirteenth embodiment is constituted by a fixed electrode portion 2d, a movable electrode portion 3b and a circuit 71 connected to the fixed electrode portion 2d and the movable electrode portion 3b, as shown in FIG. 22. A detailed description will be made hereinafter.

As shown in FIG. 22, according to the thirteenth embodiment, a stopper film 42 made of a silicon nitride film is formed on a surface of a fixed electrode 41 made of silicon in the fixed electrode portion 2d. The fixed electrode 41 is an example of the "second electrode" in the present invention. The stopper film 42 is an example of the "member" in the present invention. The stopper film 42 is convexly formed on the surface of the fixed electrode 41. The stopper film 42 is an example of the "projecting portion" in the present invention. As shown in FIG. 23, the stopper film 42 has oblong through holes in plan view. These through holes and the surface of the fixed electrode 41 form the groove-shaped recess portions 421. The recess portions 421 have widths W4 of about 10 μm to about 1000 μm and depths D1 of about 0.1 μm to about 100 μm. According to the thirteenth embodiment, the interdigital electret film 43, made of an organic material such as polytetrafluoroethylene (PTFE) or a silicon oxide film, having a thickness of about 0.1 μm to about 50 μm is so formed as to be embedded in the bottom surfaces (surfaces, formed with no stopper film 42, of the fixed electrode 41) of the groove-shaped recess portions 421. The stopper film 42 and the electret film 43 cover a surface, opposed to a movable electrode 62 described later, of the fixed electrode 41, and hence when charges are injected from a side of the surface, opposed to the movable electrode 62, of the fixed electrode 41 by corona discharge, the charges to be injected can be inhibited from flowing out through the fixed electrode 41 grounded (not shown). Consequently, dispersion of a surface potential of the electret film 43 can be suppressed.

As shown in FIG. 22, the movable electrode portion 3b is arranged at a interval from the fixed electrode portion 2d. In the movable electrode portion 3b, a movable electrode 62 made of aluminum, titanium or the like is formed on a surface of a movable substrate 61 made of quartz. The movable electrode 62 is an example of the "first electrode" in the present invention. The movable electrode 62 is interdigitally formed as shown in FIG. 24.

As shown in FIG. 22, the fixed electrode 41 and the movable electrode 62 are electrically connected to the circuit 71 through wires 72.

A power generating operation of the electrostatic induction power generating device 1j according to the thirteenth embodiment of the present invention will be now described with reference to FIG. 22.

When no vibration is applied to the electrostatic induction power generating device 1j, the stopper film 42 and the movable electrode 62 are arranged to be opposed to each other at a prescribed interval, as shown in FIG. 22. Then, vibration is applied to the electrostatic induction power generating device 1j in a first direction of a horizontal direction (direction X), so that the electret film 43 and the movable electrode 62 are arranged to be opposed to each other at a prescribed interval. At this time, positive charges or negative charges are stored in the surface of the electret film 43, and charges opposite to the charges stored in the electret film 43 on a side of the movable electrode 62 are induced in the movable electrode 62 by electrostatic induction.

Then, the electrostatic induction power generating device 1*j* moves in a second direction of the direction X, so that the stopper film 42 and the movable electrode 62 are opposed to each other as shown in FIG. 22. Thus, the amount of electric charges induced in the movable electrode 62 is changed. This changed amount of the electric charges is extracted by the circuit 71 connected to the fixed electrode 41 and the movable electrode 62 thought the wires 72, thereby generating power.

According to the thirteenth embodiment, as hereinabove described, the electrostatic induction power generating device 1*j* comprises the stopper film 42 and the groove-shaped recess portions 421 provided on the surface of the fixed electrode 41, and the electret film 43 is so formed as to be embedded in the bottom surfaces of the recess portions 421, whereby the stopper film 42 can inhibit the movable electrode 62 from moving in the direction Z (vertical direction) shown in FIG. 22 by a physical impact and coming into contact with the electret film 43, and hence the amount of electric charges stored in the electret film 43 can be inhibited from change due to contact between the movable electrode 62 and the electret film 43.

Fourteenth Embodiment

Figure 25:
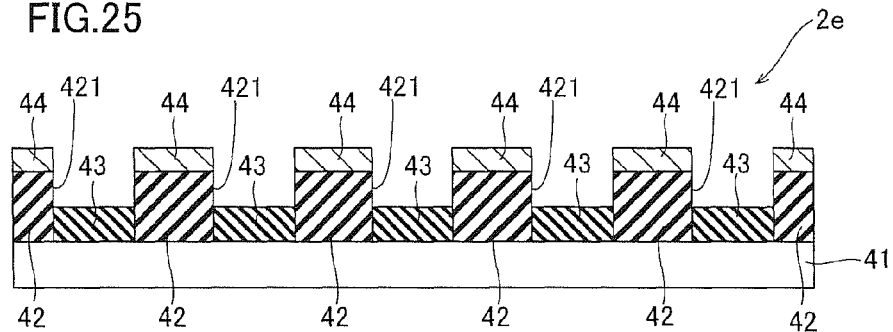
FIG. 25 A sectional view of a fixed electrode portion of an electrostatic induction power generating device according to a fourteenth embodiment of the present invention.

Referring to FIG. 25, a fixed electrode portion 2*e* formed with a conductive layer 44 on a surface of a stopper film 42 will be described in this fourteenth embodiment dissimilarly to the aforementioned thirteenth embodiment.

In this fixed electrode portion 2*e* according to the fourteenth embodiment, the conductive layer 44 is formed on the surface of the stopper film 42, as shown in FIG. 25. The remaining structure of the fourteenth embodiment is similar to that of the aforementioned thirteenth embodiment.

According to the fourteenth embodiment, as hereinabove described, the conductive layer 44 is formed on the surface of the stopper film 42, whereby components other than a component in a direction perpendicular to a main surface of an electret film 43 in an electric field resulting from electric charges stored in the electret film 43 can be inhibited from generation, and hence the electric field can be inhibited from reaching a position not opposed to the main surface of the electret film 43. Thus, difference in potentials between a position opposed to the main surface of the electret film 43 and the position not opposed to the electret film 43 can be increased, and hence difference between the amount of electric charges induced in an movable electrode 62 (see FIG. 22) by electrostatic induction in a case where the movable electrode 62 is at the position opposed to the electret film 43 and the amount of electric charges induced in the movable electrode 62 by electrostatic induction in a case where the movable electrode 62 is at the position not opposed to the electret film 43 can be increased. Consequently, the amount of power generation can be increased.

Fifteenth Embodiment

Figure 26:
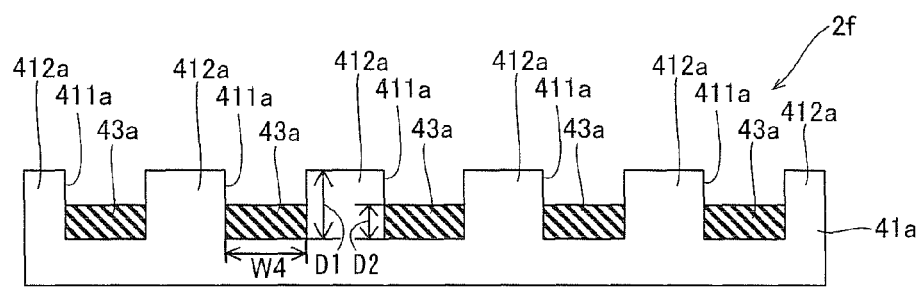
FIG. 26 A sectional view of a fixed electrode portion of an electrostatic induction power generating device according to a fifteenth embodiment of the present invention.

Referring to FIG. 26, a fixed electrode portion 2*f* formed with groove shaped recess portions 411*a* and a projecting portion 412*a* on a surface of a fixed electrode 41*a* will be described in this fifteenth embodiment dissimilarly to the aforementioned thirteenth embodiment.

In this fixed electrode portion 2*f* according to the fifteenth embodiment, the groove shaped recess portions 411*a* and the projecting portion 412*a* are formed on the surface of the fixed electrode 41*a*, as shown in FIG. 26. The fixed electrode 41*a* is an example of the "second electrode" in the present invention. Each of the recess portions 411*a* has a width W4 of about 10 μm to about 1000 μm and a depth D1 of about 0.1 μm to about 100 μm. Similarly to the seventh embodiment shown in FIG. 23, the groove shaped recess portions 411*a* are oblongly formed in plan view. According to the fifteenth embodiment, electret films 43 made of an organic material such as PTFE or a silicon oxide film, having a thickness of about 0.1 μm to about 50 μm smaller than the depth D1 of each recess portion 411*a* is so formed as to fill up a bottom surface of the groove shaped recess portion 411*a*.

The remaining structure of the fifteenth embodiment is similar to that of the aforementioned thirteenth embodiment.

According to the fifteenth embodiment, as hereinabove described, the groove shaped recess portions 411*a* and the projecting portion 412*a* provided on the surface of the fixed electrode 41*a* are provided and the electret films 43*a* are so formed as to be embedded in the bottom surfaces of the recess portions 411*a*, whereby the projecting portion 412*a* can inhibit a movable electrode 62 from moving in a direction Z (vertical direction) shown in FIG. 22 by a physical impact and coming into contact with the electret films 43*a*, and hence the amount of electric charges stored in the electret films 43*a* can be inhibited from change due to contact between the movable electrode 62 and the electret films 43*a*. Further, the electret films 43*a* are so formed as to be embedded in the bottom surfaces of the recess portions 411*a* provided on the surface of the fixed electrode 41*a*, whereby the electret films 43*a* are not separated by cleavage in a case where a plurality of the electret films 43*a* are formed on the fixed electrode 41*a* and the fixed electrode 41*a* is separated into individual fixed electrodes 41*a* by cleavage, dissimilarly to a case where the electret film 43*a* is formed on an overall surface of the fixed electrode 41*a*, and hence charges can be inhibited from flowing out of cleavage surfaces of the electret films 43*a*. Thus, reduction in surface potentials of the electret films 43*a* can be suppressed.

Sixteenth Embodiment

Figure 27:
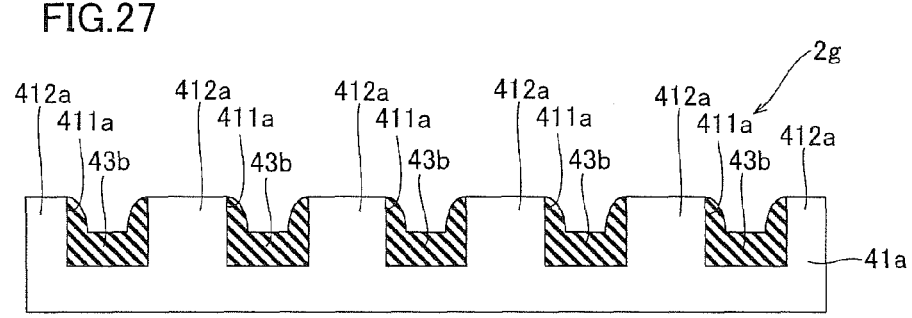
FIG. 27 A sectional view of a fixed electrode portion of an electrostatic induction power generating device according to a sixteenth embodiment of the present invention.

Referring to FIG. 27, a fixed electrode portion 2*g* where electret films 43*b* are formed also on side surfaces of groove shaped recess portions 411*a* will be described in this sixteenth embodiment dissimilarly to the aforementioned fifteenth embodiment.

In the fixed electrode portion 2*g* according to the sixteenth embodiment, the electret films 43*b* made of an organic material such as PTFE or a silicon oxide film are so formed as to be embedded in bottom surfaces of the groove shaped recess portions 411*a* and also in the side surfaces of the groove shaped recess portions 411*a* as shown in FIG. 27. Thus, the electret films 43*b* are formed on the side surfaces of the groove shaped recess portions 411*a* and a large number of electric charges can be stored, and hence the amount of electric charges stored in the electret films 43*b* can be increased. Consequently, the amount of power generation can be increased.

The remaining structure of the sixteenth embodiment is similar to that of the aforementioned fifteenth embodiment.

Seventeenth Embodiment

Figure 28:
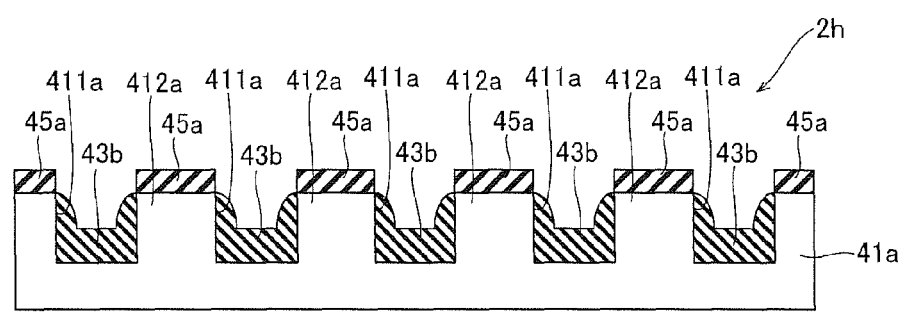
FIG. 28 A sectional view of a fixed electrode portion of an electrostatic induction power generating device according to a seventeenth embodiment of the present invention.

Referring to FIG. 28, a fixed electrode portion 2*h* where a stopper film 45*a* is formed on a surface of a projecting portion 412a will be described in this seventeenth embodiment dissimilarly to the aforementioned sixteenth embodiment.

In this fixed electrode portion 2h according to the seventeenth embodiment, the stopper film 45a made of an insulating film having a breakdown voltage smaller than electret films 43b is formed on the surface of the projecting portion 412a, as shown in FIG. 28. The stopper films 45a are examples of the "member" in the present invention. While the electret films 43b shown in FIG. 28 are formed on inner sides of groove shaped recess portions 411a, the ends of the electret films 45b may be formed as to be embedded between the stopper film 45a and the projecting portion 412a. At this time, the ends of the stopper film 45a is formed in upwardly warped shapes.

The remaining structure of the seventeenth embodiment are similar to that of the aforementioned sixteenth embodiment.

According to the seventeenth embodiment, as hereinabove described, the stopper film 45a having the breakdown voltage smaller than the electret films 43b is formed on the surface of the projecting portion 412a, whereby even when the electret films 43b and the stopper film 45a are simultaneously made electret, the stopper film 45a first causes dielectric breakdown due to the smaller breakdown voltage of the stopper film 45a than the electret films 43b, and hence the electret films 43b can store a larger number of electric charges and the amounts of electric charges stored in the electret films 43b and the stopper film 45a are made different from each other. Thus, an intensity of an electric field on the surface of each electret film 43b and an intensity of an electric field on the surface of the stopper film 45a can be made different. The stopper film 45a is formed on the surface of the projecting portion 412a, whereby the movable electrode 62 (see FIG. 22) and the electret films 43b can be easily inhibited from coming into contact with each other.

Eighteenth Embodiment

Figure 29:
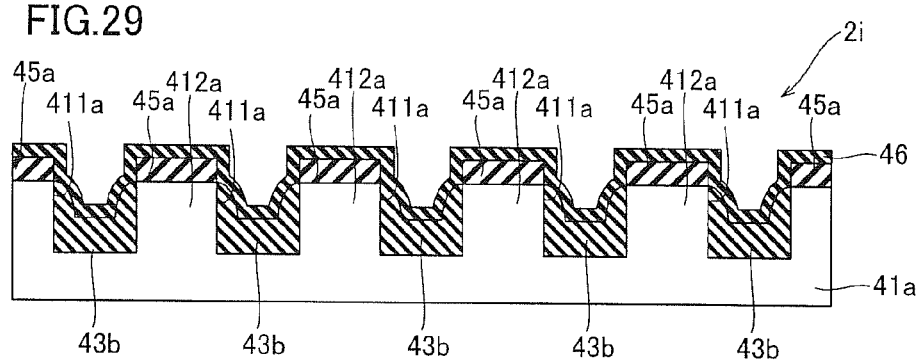
FIG. 29 A sectional view of a fixed electrode portion of an electrostatic induction power generating device according to an eighteenth embodiment of the present invention.

Referring to FIG. 29, a fixed electrode portion 21 formed with a charge outflow inhibition film 46 on a surface thereof will be described in this eighteenth embodiment dissimilarly to the aforementioned seventeenth embodiment.

In this fixed electrode portion 21 according to the eighteenth embodiment, the charge outflow inhibition film 46 made of MSQ (methyl silses quioxane) is formed on the surface of the fixed electrode portion 21 as shown in FIG. 29. Thus, electric charges can be inhibited from flowing out of electret films 43b. The electret films 43b are formed on bottom surfaces and side surfaces of recess portions 411a and central portions of the electret films 43b are concave. The charge outflow inhibition film 46 formed on the central portions of the electret films 43b is also concave similarly to this. Thus, the charge outflow inhibition film 46 formed on the central portions of the electret films 43b can be inhibited from deterioration even when the charge outflow inhibition film 46 formed on the stopper film 45a is deteriorated by abrasion or the like. Consequently, the life of the electret films 43b can be increased.

The remaining structure of the eighteenth embodiment is similar to that of the aforementioned seventeenth embodiment.

Nineteenth Embodiment

Figure 30:
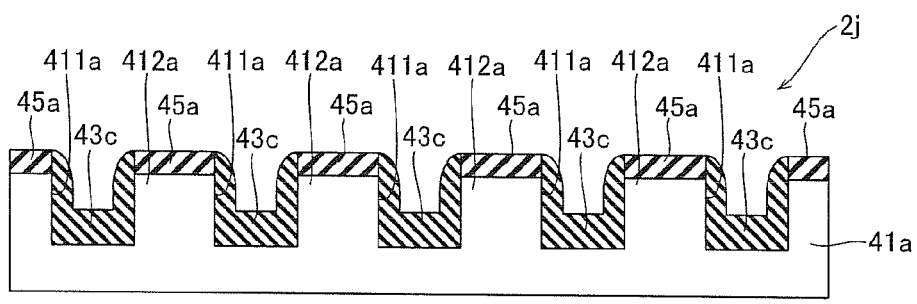
FIG. 30 A sectional view of a fixed electrode portion of an electrostatic induction power generating device according to a nineteenth embodiment of the present invention.

Referring to FIG. 30, a fixed electrode portion 2j where electret films 43c are formed also on side surfaces of a stopper film 45a will be described in this nineteenth embodiment dissimilarly to the aforementioned seventeenth embodiment.

In the fixed electrode portion 2j according to the nineteenth embodiment, the electret films 43c made of an organic material such as PTFE or a silicon oxide film are so formed as to be embedded in bottom surfaces of groove shaped recess portions 411a and also in side surfaces of the groove shaped recess portions 411a and the side surfaces of the stopper film 45a as shown in FIG. 30. The electret films 43c are formed also on the side surfaces of the stopper film 45a and electric charges stored in the electret films 43c can be increased.

The remaining structure of the nineteenth embodiment is similar to that of the aforementioned seventeenth embodiment.

Twentieth Embodiment

Figure 31:
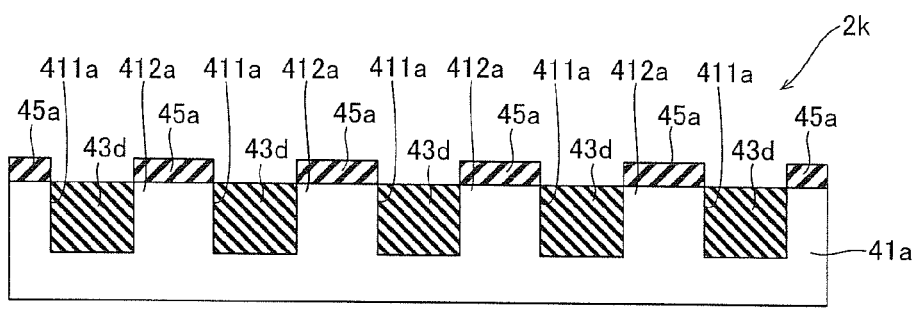
FIG. 31 A sectional view of a fixed electrode portion of an electrostatic induction power generating device according to a twentieth embodiment of the present invention.

Referring to FIG. 31, a fixed electrode portion 2k where electret films 43d are so formed as to be embedded in recess portions 411a will be described in this twentieth embodiment dissimilarly to the aforementioned nineteenth embodiment.

In this fixed electrode portion 2k according to the twentieth embodiment, the electret films 43d made of an organic material such as PTFE or a silicon oxide film are so formed as to be embedded in recess portions 411a as shown in FIG. 31.

The remaining structure of the twentieth embodiment is similar to that of the aforementioned seventeenth embodiment.

The effects of the twentieth embodiment are similar to those of the aforementioned seventeenth embodiment.

Twenty-First Embodiment

Figure 32:
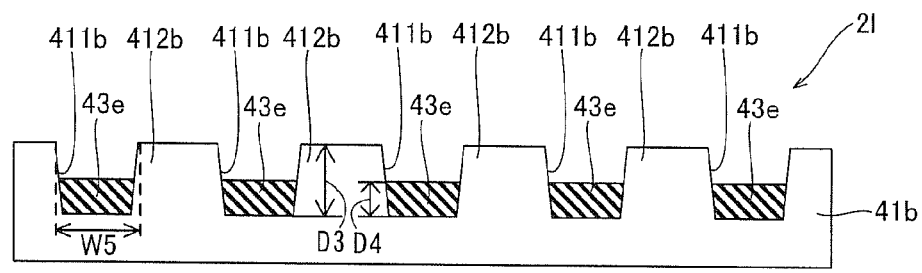
FIG. 32 A sectional view of a fixed electrode portion of an electrostatic induction power generating device according to a twenty-first embodiment of the present invention.

Referring to FIG. 32, a fixed electrode portion 2l where recess portions 411b are so formed that widths thereof are increased from bottom surfaces of the recess portions 411b toward open upper ends thereof will be described in this twenty-first embodiment dissimilarly to the aforementioned fifteenth to twentieth embodiments.

In the fixed electrode portion 2l according to the twenty-first embodiment, the groove shaped recess portions 411b and a projecting portion 412b are formed on a surface of a fixed electrode 41b as shown in FIG. 32. The fixed electrode 41b is an example of the "second electrode" in the present invention. The projecting portion 412b is an example of the "member" in the present invention. The recess portions 411b have widths W5 of about 10 µm to about 1000 µm and depths D3 of about 0.1 µm to about 100 µm. According to the twenty-first embodiment, the recess portions 411b are so formed that the widths thereof are increased from the bottom surfaces of the recess portions 411b toward the open upper ends thereof. The groove shaped recess portions 411b are oblongly formed in plan view similarly to the thirteenth embodiment shown in FIG. 23. In the groove shaped recess portions 411b, electret films 43e made of an organic material such as PTFE of a silicon oxide film are formed on bottom surfaces of the recess portions 411b with thicknesses D4 of about 0.1 µm to about 50 µm smaller than depths D3 of the recess portions 411b.

The remaining structure of the twenty-first embodiment is similar to that of the aforementioned thirteenth embodiment.

According to the twenty-first embodiment, as hereinabove described, the recess portions 411b are so formed that the widths thereof are increased from the bottom surfaces of the recess portions 411b toward the open upper ends thereof, whereby the thicknesses of the electret films 43e in the vicinity of the side surfaces of the recess portions 411b are reduced, and hence electric fields in the vicinity of the side surfaces of the recess portions 411b become weak. Thus, discharge from the electret films 43e can be suppressed, when a movable electrode 62 (see FIG. 22) comes close. The electric fields in the vicinity of the side surfaces of the recess portions 411b are weak, and hence injection of electric charges in the bottom surfaces of the electret films 43e can be inhibited from becoming difficult due to repulsion force of the electric fields in the vicinity of the side surfaces of the recess portions 411b when electric charges are injected in the electret films 43e by corona discharge. Further, the recess portions 411b are so formed that the widths thereof are increased from the bottom surfaces of the recess portions 411b toward the open upper ends thereof, whereby the side surfaces of the recess portions 411b are inclined and hence the movable electrode 62 (see FIG. 22) can be inhibited from catching the side surfaces of the recess portions 411b.

Twenty-Second Embodiment

Figure 33:
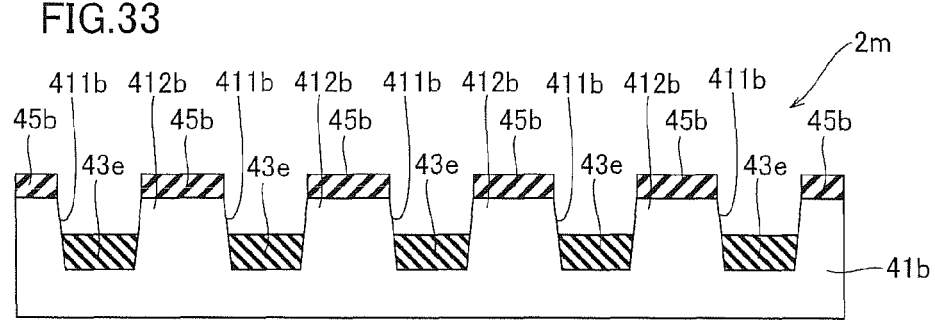
FIG. 33 A sectional view of a fixed electrode portion of an electrostatic induction power generating device according to a twenty-second embodiment of the present invention.

Referring to FIG. 33, a fixed electrode portion 2m where a stopper film 45b is formed on a surface of a projecting portion 412b will be described in this twenty-second embodiment dissimilarly to the aforementioned twenty-first embodiment.

In this fixed electrode portion 2m according to the twenty-second embodiment, the stopper film 45b made of an insulating film, having a breakdown voltage smaller than electret films 43e is formed on the surface of the projecting portion 412b, as shown in FIG. 33. The stopper film 45b is an example of the "member" in the present invention. The stopper film 45b is formed on the surface of the projecting portion 412b, whereby contact between a movable electrode 62 (see FIG. 22) and the electret films 43e can be easily suppressed.

The remaining structure of the twenty-second embodiment is similar to that of the aforementioned twenty-first embodiment.

Twenty-Third Embodiment

Figure 34:
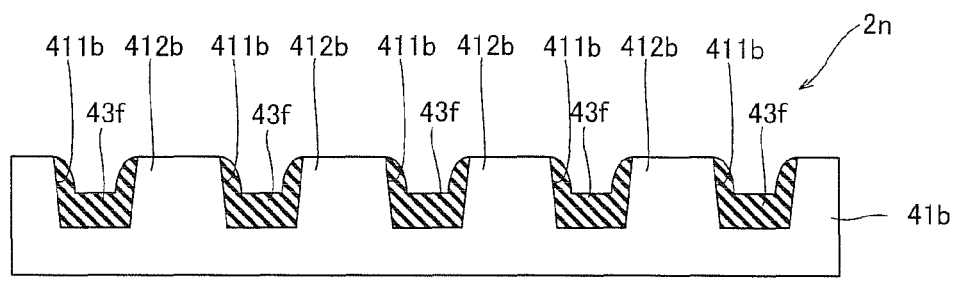
FIG. 34 A sectional view of a fixed electrode portion of an electrostatic induction power generating device according to a twenty-third embodiment of the present invention.

Referring to FIG. 34, a fixed electrode portion 2n where electret films 43f are formed also on side surfaces of groove shaped recess portions 411b will be described in this twenty-third embodiment dissimilarly to the aforementioned twenty-first embodiment.

In this fixed electrode portion 2n according to the twenty-third embodiment, the electret films 43f made of an organic material such as PTFE or a silicon oxide film are so formed as to be embedded in bottom surfaces of the groove shaped recess portions 411b and also in the side surfaces of the groove shaped recess portions 411b as shown in FIG. 34. Thus, the electret films 43f are formed also on the side surfaces of the groove shaped recess portions 411b and can store a larger amounts of electric charges, and hence the amount of electric charges stored in the electret films 43f can be increased. Consequently, the amount of power generation can be increased.

The remaining structure of the twenty-third embodiment is similar to that of the aforementioned twenty-first embodiment.

The effects of the twenty-third embodiment are similar to those of the aforementioned twenty-first embodiment.

Twenty-Fourth Embodiment

Figure 35:
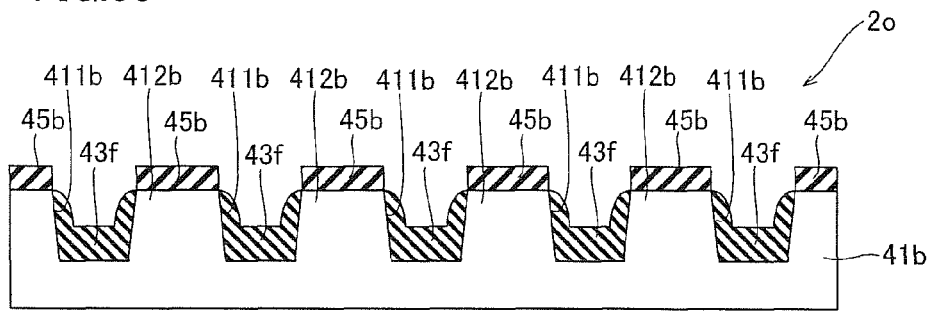
FIG. 35 A sectional view of a fixed electrode portion of an electrostatic induction power generating device according to a twenty-fourth embodiment of the present invention.

Referring to FIG. 35, a fixed electrode portion 2o where a stopper film 45b is formed on a surface of a projecting portion 412b will be described in this twenty-fourth embodiment dissimilarly to the aforementioned twenty-third embodiment.

In this fixed electrode portion 2o according to the twenty-fourth embodiment, the stopper film 45b made of an insulating film having a breakdown voltage smaller than electret films 43f is formed on the surface of the projecting portion 412b, as shown in FIG. 35. The stopper films 45b are examples of the "member" in the present invention.

The remaining structure of the twenty-fourth embodiment is similar to that of the aforementioned twenty-third embodiment.

According to the twenty-fourth embodiment, as hereinabove described, the stopper film 45b having the breakdown voltage smaller than the electret films 43f is formed on the surface of the projecting portion 412b, whereby even when the electret films 43f and the stopper film 45b are simultaneously made electret, the stopper film 45b first causes dielectric breakdown due to the smaller breakdown voltage of the stopper film 45b than the electret films 43f, and hence the amounts of electric charges stored in the electret films 43f and the stopper film 45b can be made different from each other. Thus, an intensity of an electric field on the surface of each electret film 43f and an intensity of an electric field on the surface of the stopper film 45b can be made different.

Twenty-Fifth Embodiment

Figure 36:
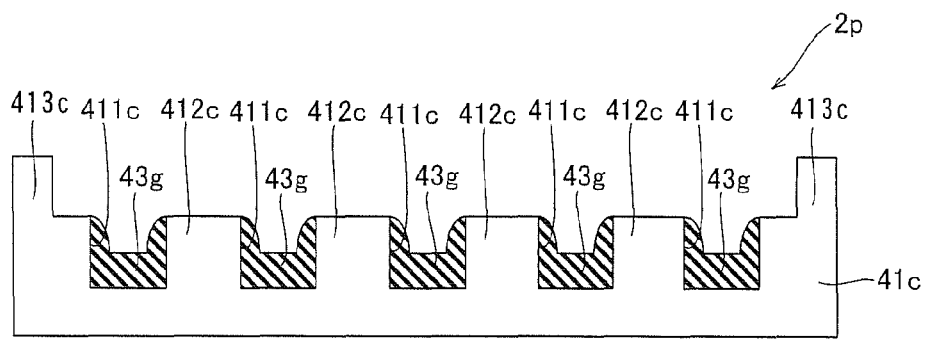
FIG. 36 A sectional view of a fixed electrode portion of an electrostatic induction power generating device according to a twenty-fifth embodiment of the present invention.

Referring to FIG. 36, a fixed electrode portion 2p where a projecting portion 413c is formed on ends of a fixed electrode 41c will be described in this twenty-fifth embodiment dissimilarly to the aforementioned fifteenth to twenty-fourth embodiments.

In this fixed electrode portion 2p according to the twenty-fifth embodiment, groove shaped recess portions 411c and a projecting portion 412c are formed on a surface of the fixed electrode 41c made of silicon as shown in FIG. 36. The fixed electrode 41c is an example of the "second electrode" in the present invention. Similarly to the thirteenth embodiment shown in FIG. 23, the groove shaped recess portions 411c are oblongly formed in plan view. According to the twenty-fifth embodiment, the projecting portion 413c for inhibiting a movable electrode 62 (see FIG. 22) and electret films 43g, described later, from coming into contact with each other is formed on the ends of the fixed electrode portion 2p. The projecting portion 413c is an example of the "member" in the present invention. The electret films 43g made of an organic material such as PTFE or a silicon oxide film are so formed as to be embedded in bottom surfaces of the groove shaped recess portions 411c and cover the side surfaces of the recess portions 411c.

The remaining structure of the twenty-fifth embodiment is similar to that of the aforementioned thirteenth embodiment.

According to the twenty-fifth embodiment, as hereinabove described, the projecting portion 413c for inhibiting the movable electrode 62 and the electret films 43g from coming into contact with each other is provided, whereby the movable electrode 62 can be inhibited from moving in a direction Z (vertical direction) shown in FIG. 22 by a physical impact and coming into contact with the electret films 43g, and hence the amount of electric charges stored in the electret films 43g can be inhibited from change due to contact between the movable electrode 62 and the electret films 43g.

Twenty-Sixth Embodiment

Figure 37:
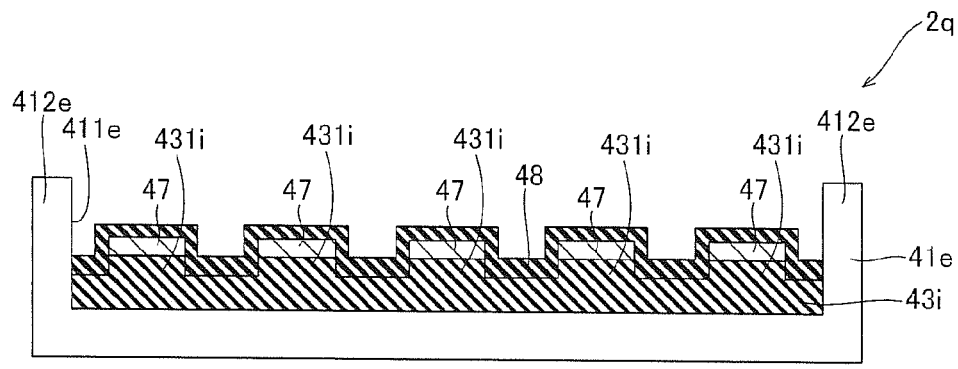
FIG. 37 A sectional view of an electrostatic induction power generating device according to a twenty-sixth embodiment of the present invention.

Referring to FIG. 37, a fixed electrode portion 2q where a charge outflow inhibition film 48 is formed on surfaces of an electret film 43i and conductive layers 47 will be described in this twenty-sixth embodiment dissimilarly to the aforementioned twenty-fifth embodiment.

In this fixed electrode portion 2q according to this twenty-sixth embodiment, a groove shaped recess portion 411e and a projecting portion 412e are formed on a surface of a fixed electrode 41e made of silicon, quartz, plastic or Teflon (registered trademark) as shown in FIG. 37. The fixed electrode 41e made of silicon is an example of the "second electrode" in the present invention. The groove shaped recess portion 411e is rectangularly formed in plan view. The projecting portion 412e has a function of inhibiting a movable electrode 62 (see FIG. 22) and the electret film 43i, described later, from coming into contact with each other. The projecting portion 412e is an example of the "member" in the present invention. The electret film 43i made of an organic material such as PTFE or a silicon oxide film, having a thickness of about 0.1 μm to about 50 μm is so formed as to be embedded in bottom surface of the groove shaped recess portion 411e. Projecting portions 431i are formed on a surface of the electret film 43i on a side opposed to the movable electrode 62 (see FIG. 22). The conductive layers 47 are formed on surfaces of the projecting portions 431i. The charge outflow inhibition film 48 made of MSQ is formed on the surfaces of the projecting portions 431i and the conductive layers 47. Thus, electric charges can be inhibited from flowing out of the surface of the electret film 43i.

The remaining structure of the twenty-sixth embodiment is similar to that of the aforementioned thirteenth embodiment.

Twenty-Seventh Embodiment

Figure 38:
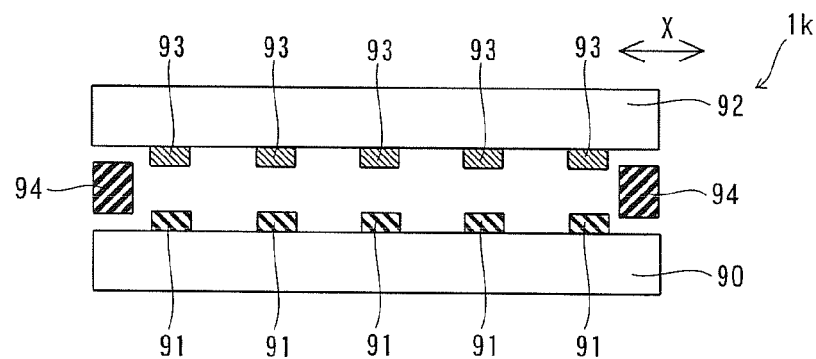
FIG. 38 A sectional view of an electrostatic induction power generating device according to a twenty-seventh embodiment of the present invention.

Referring to FIG. 38, an electrostatic induction power generating device 1k where stopper films 93 are arranged between a movable substrate 92 and a fixed electrode 90 will be described in this twenty-seventh embodiment dissimilarly to the aforementioned first to twenty-sixth embodiments.

In this electrostatic induction power generating device 1k according to the twenty-seventh embodiment, electret films 91 are formed on a surface of the fixed electrode 90 made of silicon as shown in FIG. 38. Movable electrodes 93 are so formed on a surface of the movable substrate 92 arranged to be opposed to the fixed electrode 90 as to be opposed to the electret films 91. The movable electrodes 93 is an example of the "first electrode" in the present invention. The fixed electrode 90 is an example of the "second electrode" in the present invention. The stopper films 94 are arranged between the fixed electrode 90 and the movable substrate 92 at intervals from the fixed electrode 90 and the movable substrate 92. Thus, the movable electrodes 93 and the electret films 91 can be inhibited from coming into contact with each other. The stopper films 94 are examples of the "member" in the present invention.

In the electrostatic induction power generating device 1k, the movable substrate 92 and the fixed electrode 90 relatively move in a direction X, whereby the amount of electric charges stored in the movable electrodes 93 are changed by electrostatic induction resulting from electric charges stored in the electret films 91, and hence power can be generated by extracting this changed amount of the electric charges.

Twenty-Eighth Embodiment

Figure 39:
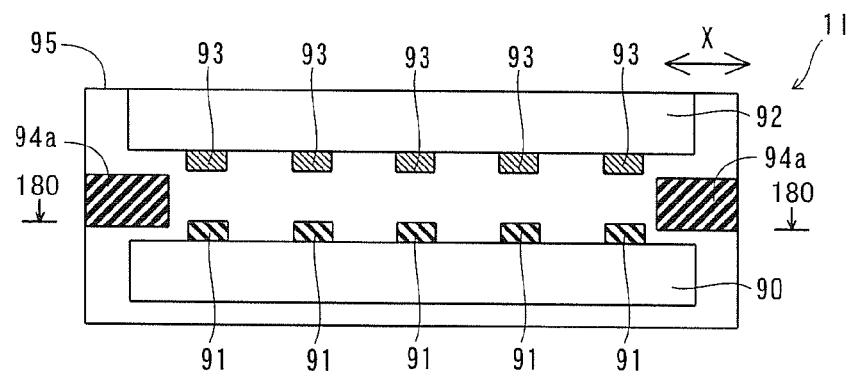
FIG. 39 A sectional view of an electrostatic induction power generating device according to a twenty-eighth embodiment of the present invention.
Figure 40:
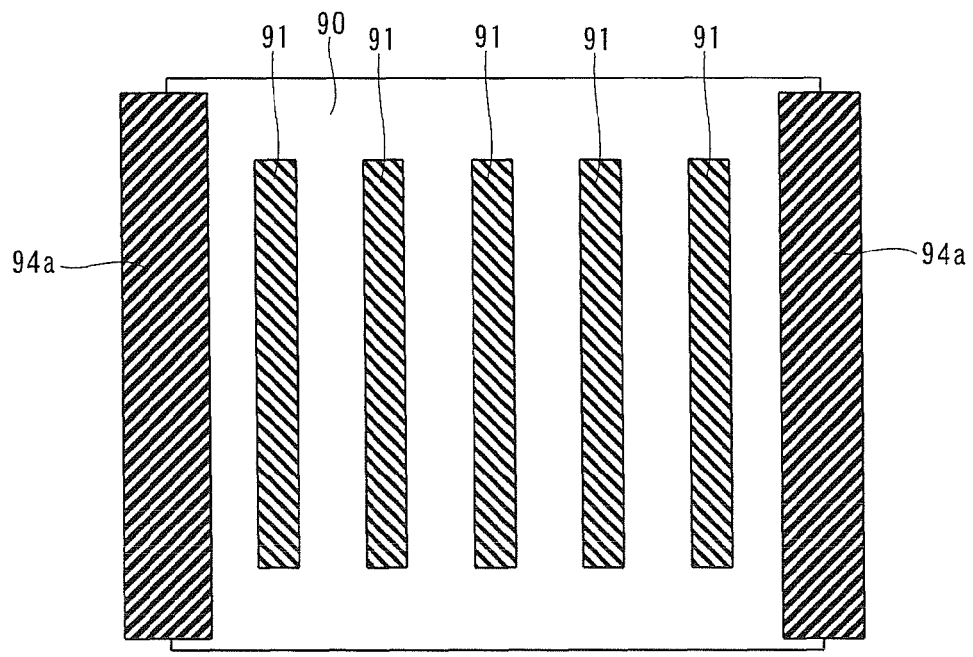
FIG. 40 A sectional view taken along the line 180-180 in FIG. 39.

Referring to FIGS. 39 and 40, an electrostatic induction power generating device 1l where stopper films 94a are arranged on a housing 95 will be described in this twenty-eighth embodiment dissimilarly to the aforementioned twenty-seventh embodiment.

In this electrostatic induction power generating device 1l according to the twenty-eighth embodiment, a movable substrate 92 is formed on a lower surface of inner surfaces of the housing 95, as shown in FIG. 39. Movable electrodes 93 are formed on a lower surface of the movable substrate 92. The movable electrodes 93 are examples of the "first electrode" in the present invention. The movable electrodes 93 are interdigitally formed. The fixed electrode 90 made of silicon is arranged at an interval from the movable substrate 92. The fixed electrode 90 is an example of the "second electrode" in the present invention. As shown in FIG. 40, the electret films 91 are formed on an upper surface of the fixed electrode 90 on a side of the movable electrodes 93 and are oblongly formed similarly to the movable electrodes 93.

As shown in FIG. 39, the stopper films 94a are arranged on side surfaces of the inner surfaces of the housing 95 between the fixed electrode 90 and the movable substrate 92 at intervals from the fixed electrode 90 and the movable substrate 92. The stopper films 94a are examples of the "member" in the present invention. The stopper films 94a are formed in a direction parallel to an extensional direction of the oblong movable electrodes 93.

In the electrostatic induction power generating device 1l, the movable substrate 92 (housing 95) and the fixed electrode 90 relatively move in a direction X, whereby the amount of electric charges stored in the movable electrodes 93 are changed by electrostatic induction resulting from electric charges stored in the electret films 91, and hence power can be generated by extracting this changed amount of the electric charges.

Twenty-Ninth Embodiment

Figure 41:
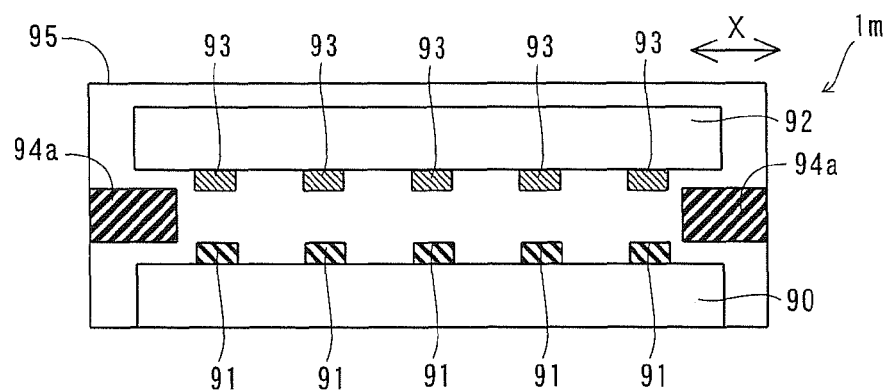
FIG. 41 A sectional view of an electrostatic induction power generating device according to a twenty-ninth embodiment of the present invention.

Referring to FIG. 41, an electrostatic induction power generating device 1m where a fixed electrode 90 is fixed to a housing 95 will be described in this twenty-ninth embodiment dissimilarly to the aforementioned twenty-eighth embodiment.

In this electrostatic induction power generating device 1m according to the twenty-ninth embodiment, the fixed electrode 90 is formed on an upper surface of an inner surface of the housing 95 as shown in FIG. 41. A movable substrate 92 is not fixed to the housing 95 dissimilarly to the twenty-eighth embodiment. The remaining structure of the twenty-ninth embodiment is similar to that of the aforementioned twenty-eighth embodiment.

Thirtieth Embodiment

Figure 42:
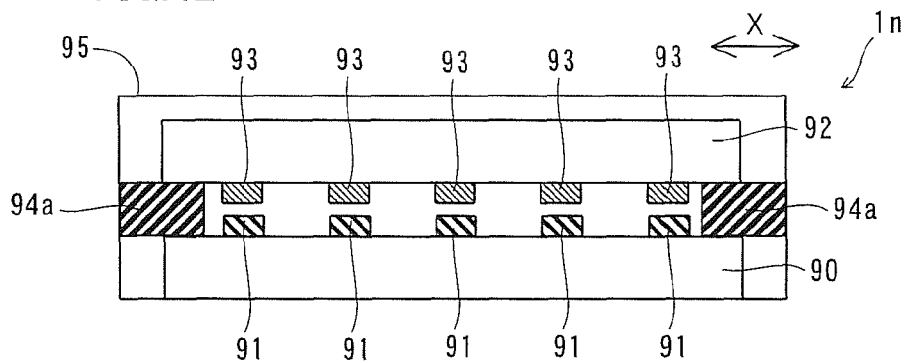
FIG. 42 A sectional view of an electrostatic induction power generating device according to a thirtieth embodiment of the present invention.

Referring to FIG. 42, an electrostatic induction power generating device 1n where stopper films 94a are in contact with a fixed electrode 90 and a movable substrate 92 will be described in this thirtieth embodiment dissimilarly to the aforementioned twenty-ninth embodiment.

In this electrostatic induction power generating device 1n according to the thirtieth embodiment, the stopper films 94a are arranged in contact with the fixed electrode 90 and the movable substrate 92 as shown in FIG. 42.

Thirty-First Embodiment

Figure 43:
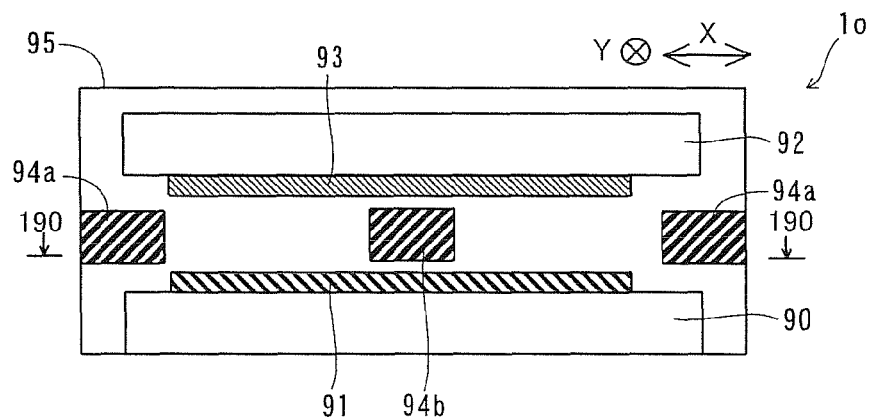
FIG. 43 A sectional view of an electrostatic induction power generating device according to a thirty-first embodiment of the present invention.
Figure 44:
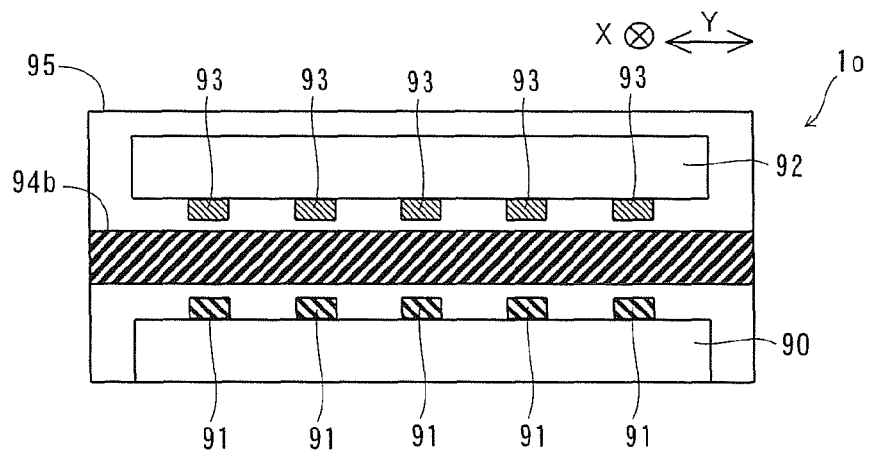
FIG. 44 A sectional view of an electrostatic induction power generating device according to a thirty-first embodiment of the present invention.
Figure 45:
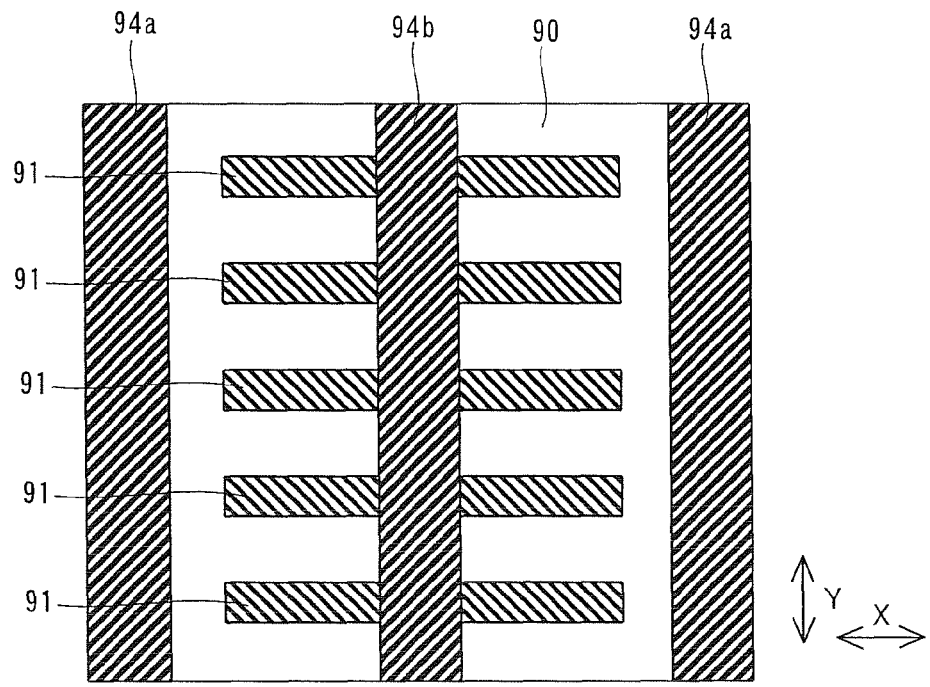
FIG. 45 A sectional view taken along the line 190-190 in FIG. 43.

Referring to FIGS. 43 to 45, an electrostatic induction power generating device 1o where stopper films 94a and a stopper film 94b are arranged on side surfaces and a central portion of inner surfaces of a housing 95 respectively will be described in this thirty-first embodiment dissimilarly to the aforementioned thirtieth embodiment.

In this electrostatic induction power generating device 1o according to the thirty-first embodiment, the stopper films 94a are arranged on the side surfaces of the inner surfaces of the housing 95 and the stopper film 94b is arranged on the central portion of the inner surfaces of the housing 95, as shown in FIGS. 43 to 45. Thus, the electret films 91 and the movable electrodes 93 can be inhibited from coming into contact with each other at the central portion even when the movable substrate 92 and the fixed electrode 90 are warped. The stopper film 94b is an example of the "member" in the present invention. The electret films 91 are oblongly formed and the stopper films 94a and 94b are so formed as to extend in a direction Y intersecting with an extensional direction (direction X) of the oblong electret films 91. In the electrostatic induction power generating device 1o, the movable substrate 92 and the fixed electrode 90 relatively move in the direction Y, thereby generating power.

Thirty-Second Embodiment

Figure 46:
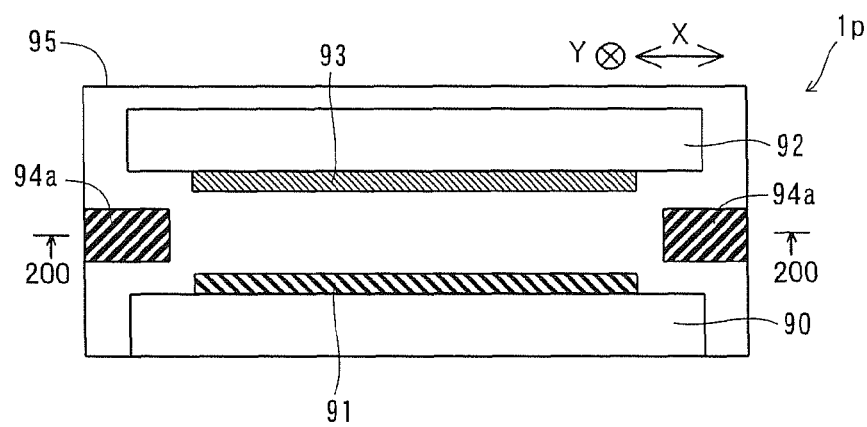
FIG. 46 A sectional view of an electrostatic induction power generating device according to a thirty-second embodiment of the present invention.
Figure 47:
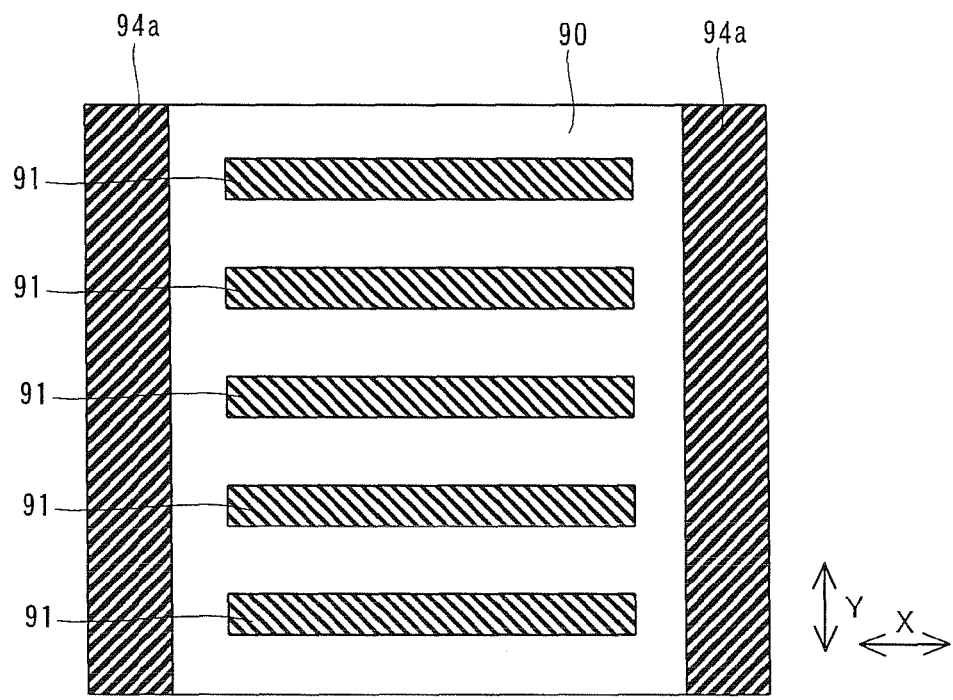
FIG. 47 A sectional view taken along the line 200-200 in FIG. 46.

Referring to FIGS. 46 and 47, an electrostatic induction power generating device 1p where stopper films 94a are arranged only on side surfaces of inner surfaces of a housing 95 will be described in this thirty-second embodiment dissimilarly to the aforementioned thirty-first embodiment.

In this electrostatic induction power generating device 1p according to the thirty-second embodiment, the stopper films 94a are arranged on the side surfaces of the inner surfaces of the housing 95 as shown in FIGS. 46 and 47 and not arranged on a central portion of the housing 95 dissimilarly to the aforementioned thirty-first embodiment. The remaining structure of the thirty-second embodiment is similar to that of the aforementioned thirty-first embodiment.

Thirty-Third Embodiment

Figure 48:
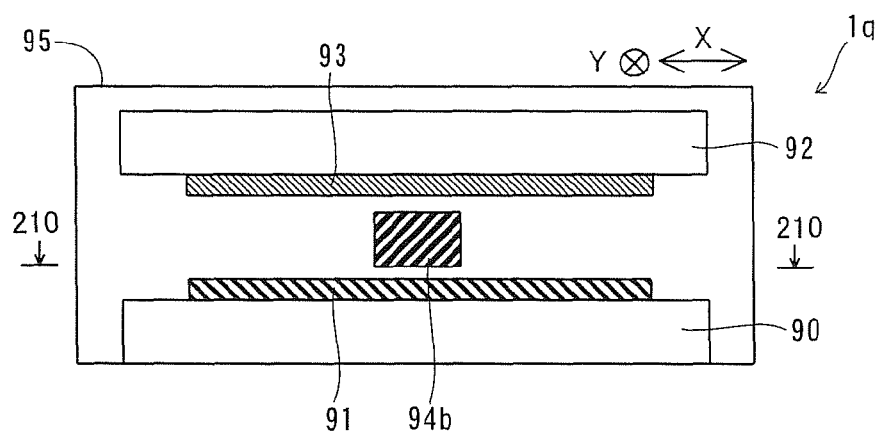
FIG. 48 A sectional view of an electrostatic induction power generating device according to a thirty-third embodiment of the present invention.
Figure 49:
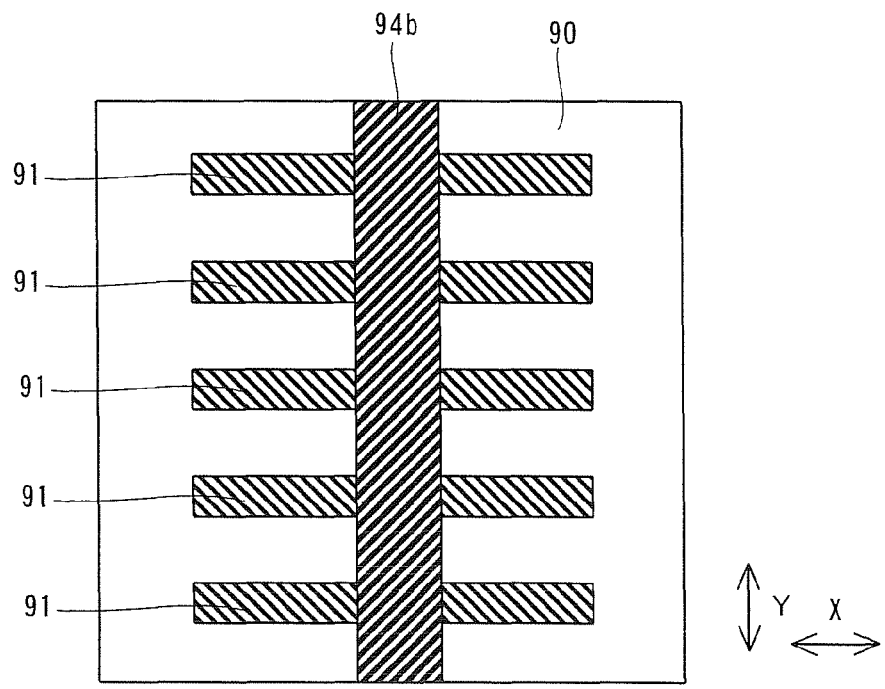
FIG. 49 A sectional view taken along the line 210-210 in FIG. 48.

Referring to FIGS. 48 and 49, an electrostatic induction power generating device 1q where stopper film 94b is arranged only on a central portion of inner surfaces of a housing 95 will be described in this thirty-third embodiment dissimilarly to the aforementioned thirty-first embodiment.

In this electrostatic induction power generating device 1q according to the thirty-third embodiment, the stopper film 94b is arranged on the central portion of the inner surfaces of the housing 95 as shown in FIGS. 48 and 49 and not arranged on the side surfaces of the housing 95 dissimilarly to the aforementioned thirty-first embodiment. The remaining structure of the thirty-third embodiment is similar to that of the aforementioned thirty-first embodiment.

Thirty-Fourth Embodiment

Figure 50:
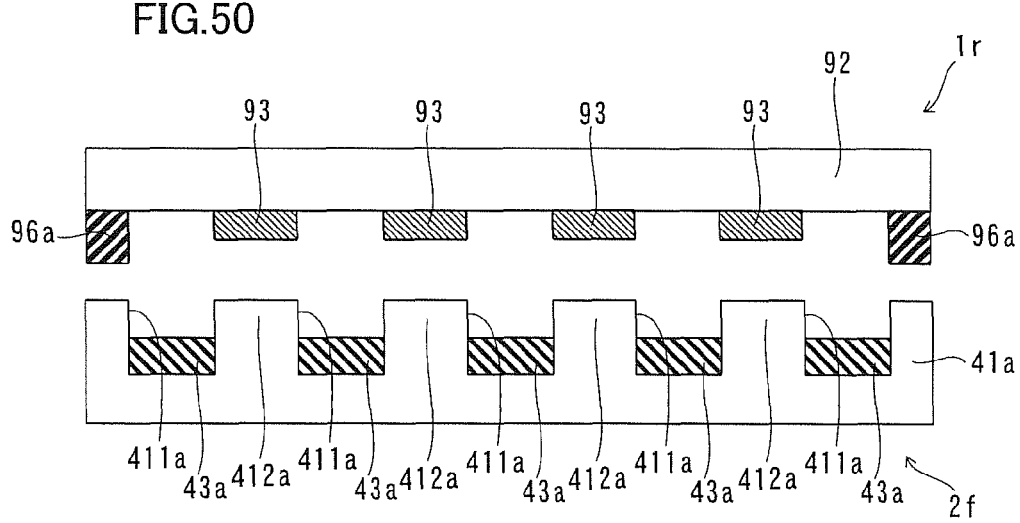
FIG. 50 A sectional view of an electrostatic induction power generating device according to a thirty-fourth embodiment of the present invention.

Referring to FIG. 50, an electrostatic induction power generating device 1r where stopper films 96a are formed on a lower surface of a movable electrode 92 will be described in this thirty-fourth embodiment dissimilarly to the aforementioned thirteenth embodiment.

In this electrostatic induction power generating device 1r according to the thirty-fourth embodiment, movable electrodes 93 are formed on the lower surface of the movable electrode 92 and the stopper films 96a are arranged on ends of the movable substrate 92 to be adjacent to the movable electrodes 93, as shown in FIG. 50. The stopper films 96a are examples of the "member" in the present invention. A fixed electrode portion 2f is provided to be opposed to the movable substrate 92. The structure of the fixed electrode portion 2f is similar to that of the aforementioned fifteenth embodiment shown in FIG. 26.

In this electrostatic induction power generating device 1r, the projecting portion 412a protruding beyond surfaces of electret films 43a is provided on the fixed electrode portion 2b and the stopper films 96a are arranged on the lower surface of the movable substrate 92, whereby the movable electrode 92 and the electret films 43a can be further inhibited from coming into contact with each other.

Thirty-Fifth Embodiment

Figure 51:
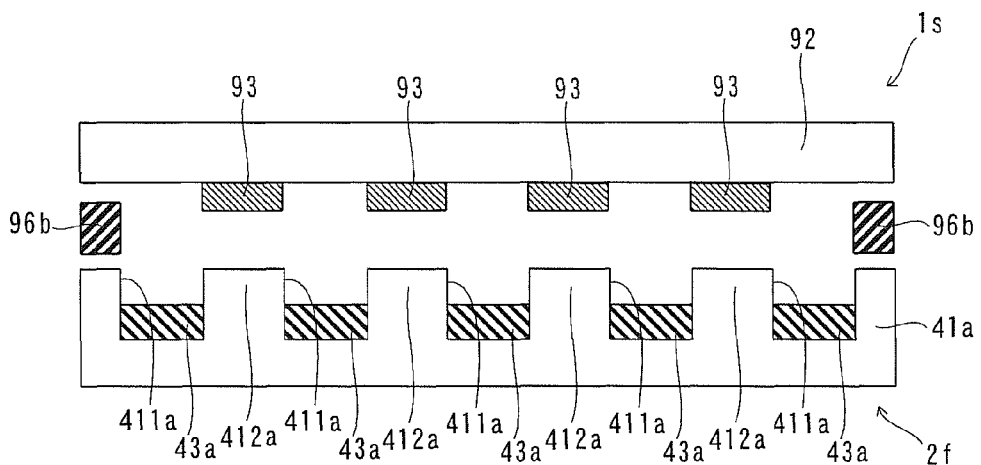
FIG. 51 A sectional view of an electrostatic induction power generating device according to a thirty-fifth embodiment of the present invention.

Referring to FIG. 51, an electrostatic induction power generating device is where stopper films 96b are arranged between a movable substrate 92 and a fixed electrode portion 2f will be described in this thirty-fifth embodiment dissimilarly to the aforementioned thirty-fourth embodiment.

In this electrostatic induction power generating device is according to the thirty-fifth embodiment, the stopper films 96b are arranged between the movable substrate 92 and the fixed electrode portion 2f at intervals from the movable substrate 92 and the fixed electrode portion 2f, as shown in FIG. 51. The stopper films 96b are examples of the "member" in the present invention. The stopper films 96b are arranged at positions opposed to ends of the movable substrate 92 and the fixed electrode portion 2f. The remaining structure of the thirty-fifth embodiment is similar to that of the aforementioned thirty-fourth embodiment.

Thirty-Sixth Embodiment

Figure 52:
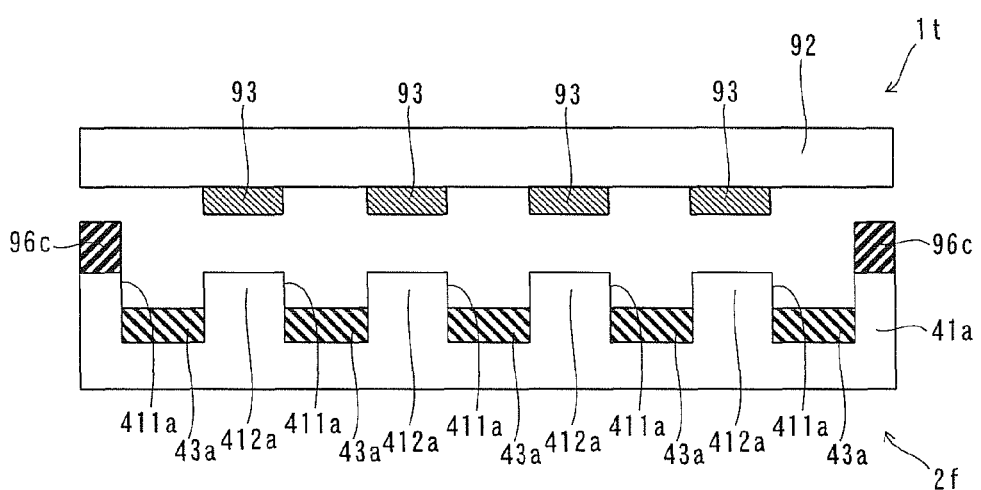
FIG. 52 A sectional view of an electrostatic induction power generating device according to a thirty-sixth embodiment of the present invention.

Referring to FIG. 52, an electrostatic induction power generating device it where stopper films 96c are arranged on an upper surface of a fixed electrode portion 2f will be described in this thirty-sixth embodiment dissimilarly to the aforementioned thirty-fourth embodiment.

In this electrostatic induction power generating device it according to the thirty-sixth embodiment, the stopper films 96c are arranged on the upper surface of ends of the fixed electrode portion 2f, as shown in FIG. 52. The stopper films 96c are examples of the "member" in the present invention. The remaining structure of the thirty-sixth embodiment is similar to that of the aforementioned thirty-fourth embodiment.

Thirty-Seventh Embodiment

Figure 53:
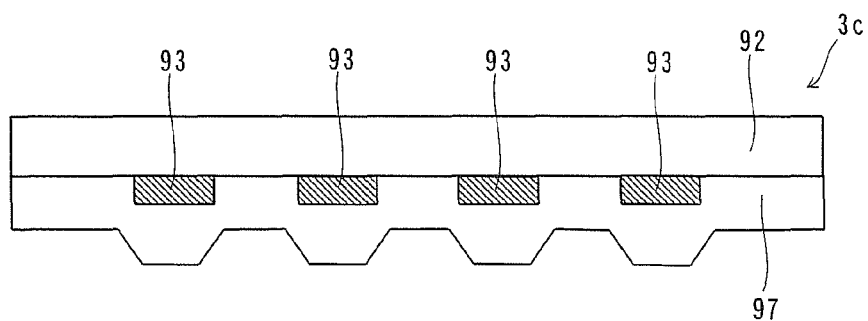
FIG. 53 A sectional view of a movable electrode portion according to a thirty-seventh embodiment of the present invention.

Referring to FIG. 53, a movable electrode portion 3c where a protective film 97 covers a surface of a movable electrode portion 3c will be described in this thirty-seventh embodiment dissimilarly to the aforementioned first to thirty-sixth embodiments.

In this movable electrode portion 3c according to the thirty-sixth embodiment, movable electrodes 93 are formed on a lower surface of a movable substrate 92 as shown in FIG. 53. The protective film 97 made of an insulating film such as a silicon oxide film or a silicon nitride film is formed to cover the lower surface of the movable substrate 92 and surfaces of the movable electrodes 93.

According to the thirty-seventh embodiment, as hereinabove described, the protective film 97 made of the insulating film such as the silicon oxide film or the silicon nitride film is formed to cover the lower surface of the movable substrate 92 and the surfaces of the movable electrodes 93, whereby the protective film 97 can inhibit electret films arranged on positions opposed to the movable electrodes 93 and the movable electrodes 93 from coming into contact with each other.

Thirty-Eighth Embodiment

Figure 54:
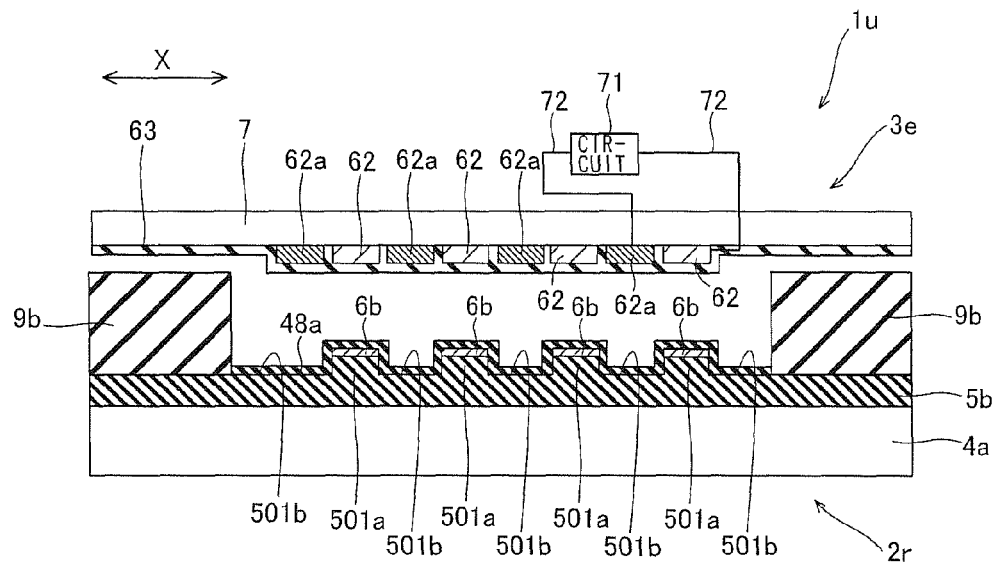
FIG. 54 A sectional view of an electrostatic induction power generating device according to a thirty-eighth embodiment of the present invention.

Referring to FIG. 54, an electrostatic induction power generating device 1$u$ where a movable electrode 62 and a movable electrode 62$a$ are provided on a surface of a movable substrate 7 to be adjacent to each other will be described in this thirty-eighth embodiment dissimilarly to the aforementioned first to thirty-seventh embodiments.

As shown in FIG. 54, this electrostatic induction power generating device 1$u$ according to the thirty-eighth embodiment is constituted by a fixed electrode portion 2$r$ and a movable electrode portion 3$e$. A detailed description will be made hereinafter.

In the fixed electrode portion 2$r$, an electret film 5$b$ made of a thermal oxide film having projecting portions 501$a$ is formed on a surface of a fixed electrode 4$a$ made of silicon, as shown in FIG. 54. Conductive layers 6$b$ are formed on surfaces of the projecting portions 501$a$. The conductive layers 6$b$ are interdigitally or oblongly formed. A charge outflow inhibition film 48$a$ is formed to cover surfaces of the electret film 5$b$ and the conductive layers 6$b$. Stoppers 9$b$ are formed on ends of the electret film 5$b$. Each of stoppers 9$b$ has a function as a spacer keeping an interval between the movable electrodes 62 and 62$a$ and the electret film 5$b$ constant.

In the movable electrode portion 3$e$, the movable electrode 62 and the movable electrode 62$a$ are provided to be adjacent to each other on a surface of the movable substrate 7 made of quartz as shown in FIG. 54. The movable electrode 62 and the movable electrode 62$a$ are examples of the "first electrode" and the "second electrode" in the present invention respectively. A protective film 63 made of a sputtered oxide film or nitride film is formed to cover surfaces of the movable substrate 7, the movable electrode 62 and the movable electrode 62$a$. A circuit 71 is electrically connected to the movable electrode 62 and the movable electrode 62$a$ through wires 72.

A power generating operation of the electrostatic induction power generating device 1$u$ according to the thirty-eighth embodiment of the present invention will be now described with reference to FIG. 54.

When no vibration is applied to the electrostatic induction power generating device 1$u$, the projecting portions 501$a$ of the electret film 5$b$ and the movable electrode 62 are arranged to be opposed to each other at a prescribed interval, as shown in FIG. 54. At this time, positive electric charges or negative electric charges are stored in the surface of the electret film 5$b$. The conductive layers 6$b$ are formed on the surfaces of the projecting portions 501$a$, whereby an electric field on a surface of a recess portion 501$b$ which is a region formed with no projecting portions 501$a$ on the surface of the electret film 5$b$ is stronger than an electric field on the surfaces of the projecting portions 501$a$. Consequently, electric charges electrostatically induced in the movable electrode 62$a$ are larger than electric charges electrostatically induced in the movable electrode 62.

Then, the movable electrode 62 moves to a position opposed to the recess portion 501$b$ and the movable electrode 62$a$ moves to positions opposed to the projecting portions 501$a$ by application of horizontal vibration (in a direction X) to the electrostatic induction power generating device 1$u$ and relative movement of the movable electrode portion 3$e$ and the fixed electrode portion 2$r$ in the direction X. Thus, electric charges electrostatically induced in the movable electrodes 62 and 62$a$ are changed. This changed amount of the electric charges electrostatically induced in the movable electrodes 62 and 62$a$ is extracted as a current through the wires 72 by the circuit 71, whereby the electrostatic induction power generating device 1$u$ can generate power.

According to the thirty-eighth embodiment, as hereinabove described, the electrostatic induction power generating device 1$u$ comprises the stoppers 9$b$ inhibiting the movable electrodes 62 and 62$a$ and the electret film 5$b$ from coming into contact with each other, whereby the movable electrodes 62 and 62$a$ and the electret film 5$b$ can be inhibited from coming into contact with each other due to a physical impact, and hence the amount of electric charges stored in the electret film 5$b$ can be inhibited from change due to contact between the movable electrodes 62 and 62$a$ and the electret film 5$b$.

Thirty-Ninth Embodiment

Figure 55:
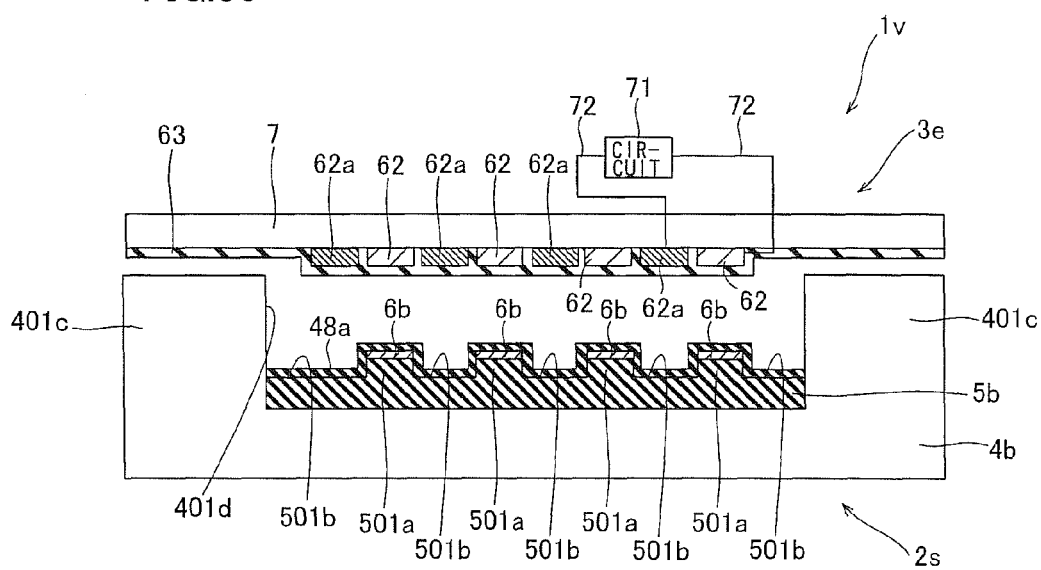
FIG. 55 A sectional view of an electrostatic induction power generating device according to a thirty-ninth embodiment of the present invention.

Referring to FIG. 55, an electrostatic induction power generating device 1$v$ where a projecting portion 401$c$ is formed on ends of a fixed substrate 4$b$ will be described in this thirty-ninth embodiment dissimilarly to the aforementioned thirty-eighth embodiment.

This electrostatic induction power generating device 1$v$ according to the thirty-ninth embodiment is constituted by a fixed electrode portion 2$s$ and a movable electrode portion 3$e$ as shown in FIG. 55. A detailed description will be made hereinafter.

In the fixed electrode portion 2$s$, an electret film 5$b$ is so formed as to be embedded in a bottom surface of a recess portion 401$d$ of the fixed substrate 4$b$ made of silicon having the projecting portion 401$c$ and the recess portion 401$d$, as shown in FIG. 55. The fixed substrate 4$b$ is an example of the "substrate" in the present invention. The projecting portion 401$c$ is an example of the "member" in the present invention. The projecting portion 401$c$ has a function as a stopper inhibiting the movable electrodes 62 and 62$a$ and the electret film 5$b$ from coming into contact with each other and also has a function as a spacer keeping an interval between the movable electrodes 62 and 62$a$ and the electret film 5$b$ constant.

The remaining structure of the thirty-ninth embodiment is similar to that of the aforementioned thirty-eighth embodiment.

An operation of the thirty-ninth embodiment is similar to that of the aforementioned thirty-eighth embodiment.

According to the thirty-ninth embodiment, as hereinabove described, the projecting portion 401$c$ of the fixed substrate 4$b$ form a stopper to inhibit the movable electrodes 62 and 62$a$ and the electret film 5$b$ from coming into contact with each other, whereby the movable electrodes 62 and 62$a$ and the electret film 5$b$ can be inhibited from coming into contact with each other due to a physical impact, and hence the amount of electric charges stored in the electret film 5$b$ can be inhibited from change due to contact between the movable electrodes 62 and 62$a$ and the electret film 5$b$.

Fortieth Embodiment

Figure 56:
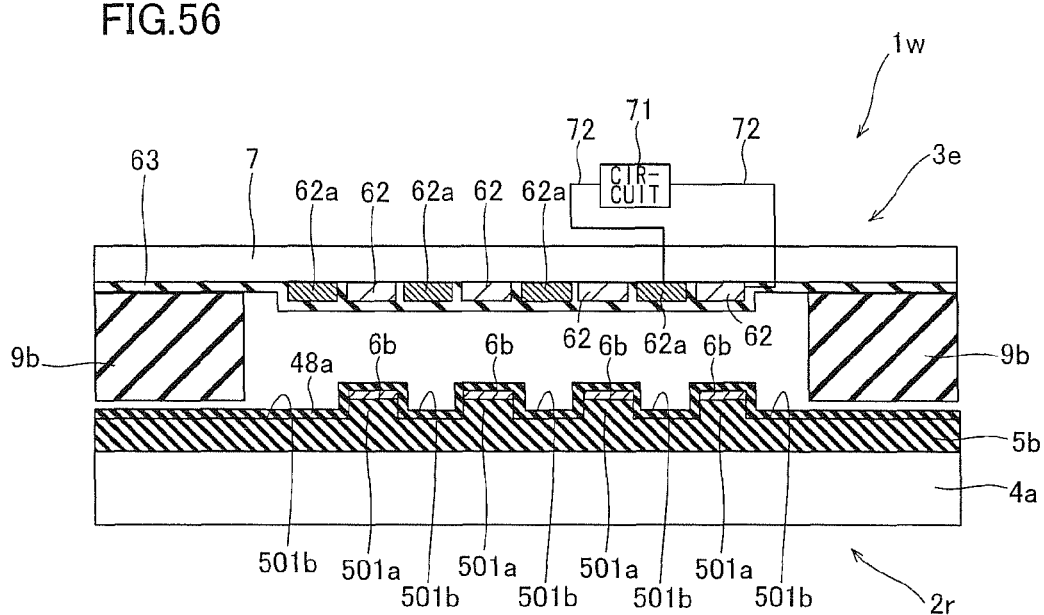
FIG. 56 A sectional view of an electrostatic induction power generating device according to a fortieth embodiment of the present invention.

Referring to FIG. 56, an electrostatic induction power generating device 1$w$ where stoppers 9$b$ are formed on a surface of a protective film 63 will be described in this fortieth embodiment dissimilarly to the aforementioned thirty-eighth embodiment.

In this electrostatic induction power generating device 1$w$ according to the fortieth embodiment, the stoppers 9$b$ are formed on the surface of the protective film 63 as shown in FIG. 56. The remaining structure of the fortieth embodiment is similar to that of the aforementioned thirty-eighth embodiment.

An operation of the fortieth embodiment is similar to that of the aforementioned thirty-eighth embodiment.

Forty-First Embodiment

Figure 57:
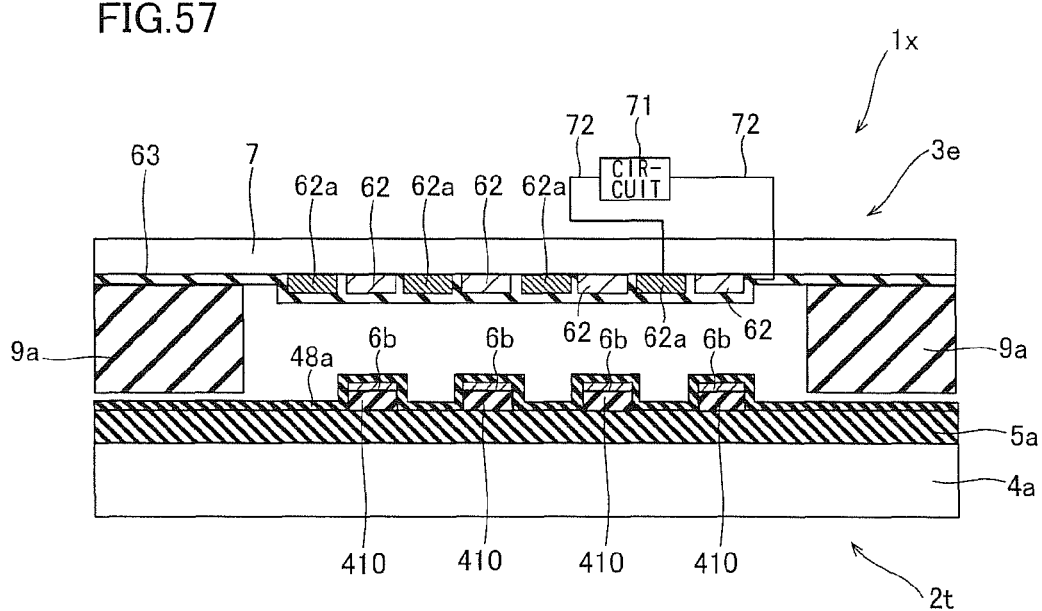
FIG. 57 A sectional view of an electrostatic induction power generating device according to a forty-first embodiment of the present invention.

Referring to FIG. 57, an electrostatic induction power generating device 1x where insulating films 410 are formed on a surface of an electret film 5a will be described in this forty-first embodiment dissimilarly to the aforementioned thirty-eighth embodiment.

In a fixed electrode portion 2t of this electrostatic induction power generating device 1x according to the forty-first embodiment, the electret film 5a is formed on a surface of a fixed electrode 4a as shown in FIG. 57. The insulating films 410 are formed on the surface of the electret film 5a. The insulating films 410 are interdigitally or oblongly formed. Conductive layers 6b are formed on surfaces of the insulating films 410. A charge outflow inhibition film 48a is formed to cover surfaces of the electret film 5a and the conductive layers 6b.

The remaining structure of the forty-first embodiment is similar to that of the aforementioned thirty-eighth embodiment.

An operation of the forty-first embodiment is similar to that of the aforementioned thirty-eighth embodiment.

The embodiments disclosed this time must be considered as illustrative in all points and not restrictive. The range of the present invention is shown not by the above description of the embodiments but by the scope of claims for patent, and all modifications within the meaning and range equivalent to the scope of claims for patent are included.

For example, while the example of employing the interdigital or oblong electret film(s) and movable electrode(s) is shown in each of the aforementioned first to eleventh embodiments and thirteenth embodiment to forty-first embodiments, the present invention is not restricted to this but a movable electrode(s) and an electret film(s) formed in shapes other than the interdigital shapes may be employed so far as the movable electrode(s) and the electret film(s) are formed such that the opposing areas are changed by vibration.

While the example of employing the interdigital electret film and movable electrode is shown in the aforementioned twelfth embodiment, the present invention is not restricted to this but a movable electrode(s) and an electret film(s) formed in shapes other than the interdigital shapes may be employed so far as the movable electrode(s) and the electret film(s) are opposed to each other.

While the example of employing the fixed substrate and the movable substrate made of glass is shown in each of the aforementioned seventh to twelfth embodiments, the present invention is not restricted to this but a fixed substrate and a movable substrate made of silicon may be employed.

While the example of employing the column portion made of silicon is shown in each of the aforementioned seventh to twelfth embodiments, the present invention is not restricted to this but a column portion made of polyimide which is an organic polymer material may be employed.

While the example of employing the electret film made of Teflon (registered trademark) is shown in each of the aforementioned seventh to twelfth embodiments, the present invention is not restricted to this but an electret film made of PP (polypropylene), PET (polyethylene terephthalate), PVC (polyvinyl chloride), PS (polystyrene), PTFE (polytetrafluoroethylene), PFA (copolymer of tetrafluoroethylene and perfluoro alkylvinyl ether), FEP (copolymer of tetrafluoroethylene and hexafluoropropylene), ETFE (copolymer of tetrafluoroethylene and ethylene), PVDF (polyvinylidene-fluoride (2 fluoride)), PCTFE (polychlorotrifluoroethylene (3 fluoride)), ECTFE (ethylene-chloro trifluoro ethylene copolymer), PVF (poly vinyl fluoride (polyvinyl chloride)), $SiO_2$ (silicon oxide film), SiN (silicon nitride film) may be employed.

While the example of forming the stopper film to be stacked on the guard electrode is shown in each of the aforementioned eighth to eleventh embodiments, the present invention is not restricted to this but the stopper film and the guard electrode may be arranged on planarly different positions.

While the example of forming the electret film on the side of the fixed electrode is shown in each of the aforementioned seventh to twelfth embodiments, the present invention is not restricted to this but the electret film may be formed on the side of the movable electrode.

While the example of forming the stopper film on the side of the fixed electrode is shown in each of the aforementioned seventh to twelfth embodiments, the present invention is not restricted to this but the stopper film may be formed on the side of the movable electrode. When the electret film and the stopper film are formed on different electrode sides, the electret film is deteriorated by contact between the electret film and the stopper film, and hence the electret film and the stopper film are preferably formed on the same electrode side.

While the example of forming the stopper film is shown in each of the aforementioned seventh to twelfth embodiments, the present invention is not restricted to this but the guard electrode may be employed as a stopper.

Figure 58:
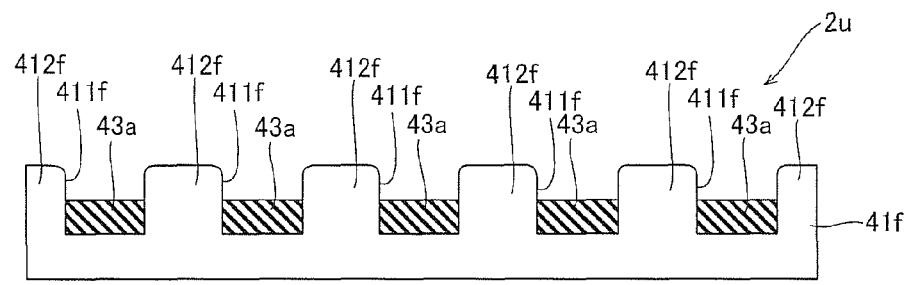
FIG. 58 A sectional view of a fixed electrode portion of an electrostatic induction power generating device according to a modification of the fifteenth embodiment of the present invention.

While the example where the ends of the projecting portion 412a are angular is shown in the aforementioned fifteenth embodiment, the present invention is not restricted to this but ends of a projecting portion 412f of a fixed electrode 41f having recess portions 411f may be chamfered as in an fixed electrode portion 2a shown in FIG. 58. Thus, the movable electrode 62 (see FIG. 22) can be inhibited from catching the projecting portion 412f.

Figure 59:
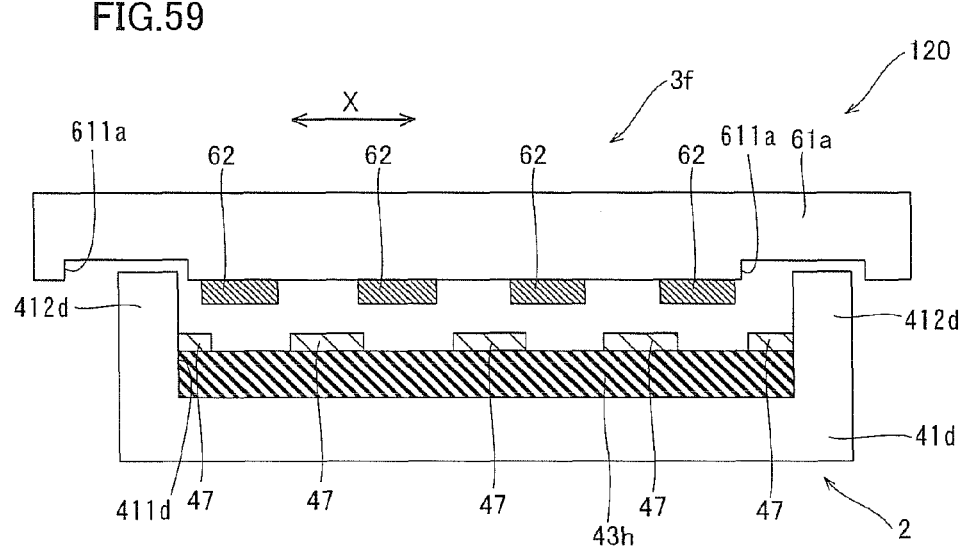
FIG. 59 A sectional view of an electrostatic induction power generating device according to a first modification of the first embodiment of the present invention.

While the example where the surface of the movable substrate 7 is flat is shown in the aforementioned first embodiment, the present invention is not restricted to this but recess portions 611a may be formed on a surface of a movable substrate 61a on a side opposed to a fixed electrode portion 2 as in a movable electrode portion 3f of an electrostatic induction power generating device 120 shown in FIG. 59. Thus, projecting portions 412d of a fixed electrode 41d come into contact with side surfaces of the recess portions 611a of the movable substrate 61a when the movable substrate 61a vibrates in a direction X, and hence a vibration width of the movable substrate 61a can be adjusted by adjusting widths of the recess portions 611a.

Figure 60:
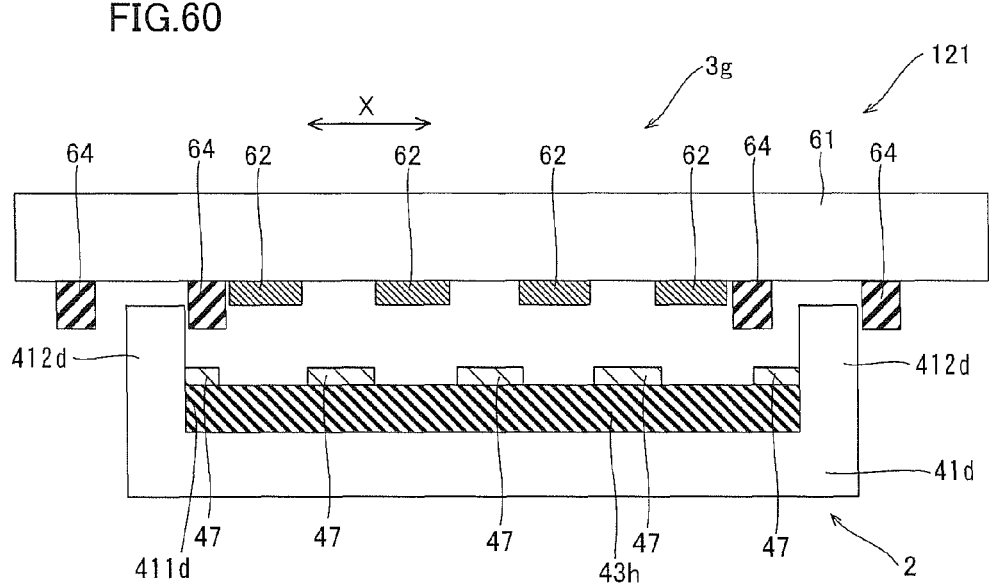
FIG. 60 A sectional view of an electrostatic induction power generating device according to a second modification of the first embodiment of the present invention.

While the example where the surface of the movable substrate 7 is flat is shown in the aforementioned first embodiment, the present invention is not restricted to this but stopper portions 64 made of an insulating film may be provided on a surface of a movable substrate 61 on a side opposed to a fixed electrode portion 2 so as to hold upper ends of projecting portions 412d of a fixed electrode 41d therebetween as in a movable electrode portion 3g of an electrostatic induction power generating device 121 shown in FIG. 60. Thus, the projecting portions 412d of the fixed electrode 41d and the side surfaces of the stopper portions 64 come into contact with each other when the movable substrate 61 vibrates in a direction X, and hence a vibration width of the movable substrate 61 can be adjusted by adjusting intervals of the stopper portions 64.

Figure 61:
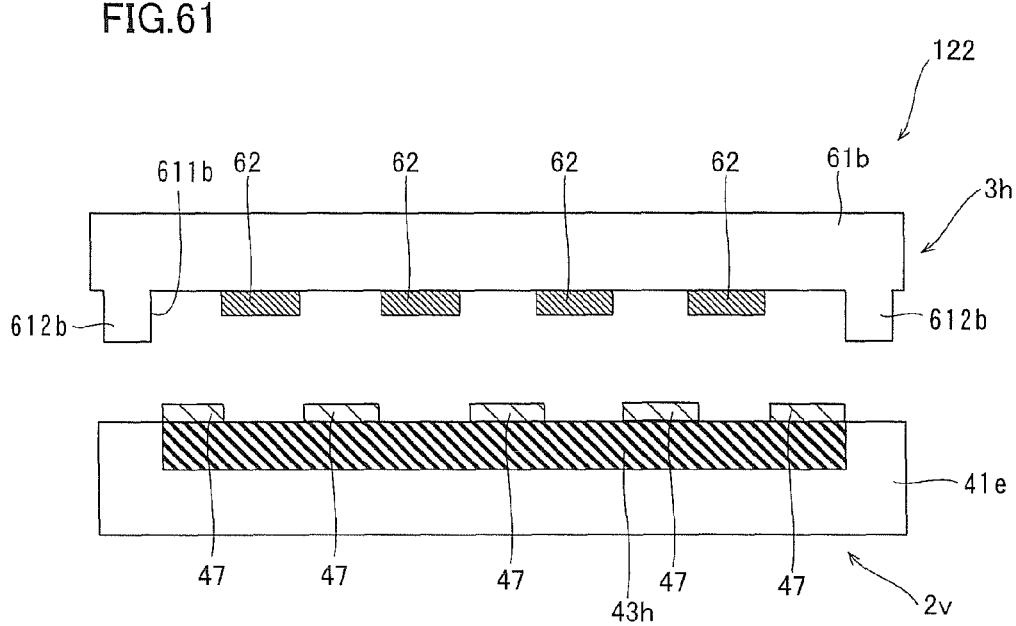
FIG. 61 A sectional view of an electrostatic induction power generating device according to a third modification of the first embodiment of the present invention.

While the example of providing the projecting portion 401b on the surface of the fixed electrode 2 is shown in the aforementioned first embodiment, the present invention is not restricted to this but a recess portion 611b and projecting portions 612b for inhibiting a movable electrode 62 and conductive layers 47 from coming into contact with each other may be provided on a surface of a movable substrate 61b as in a movable electrode portion 3h of an electrostatic induction power generating device 122 shown in FIG. 61 in place of provision of a projecting portion on a surface of the fixed electrode 41e of a fixed electrode portion 2v. At this time, the movable electrode 62 is formed on the surface of the recess portion 611b.

Figure 62:
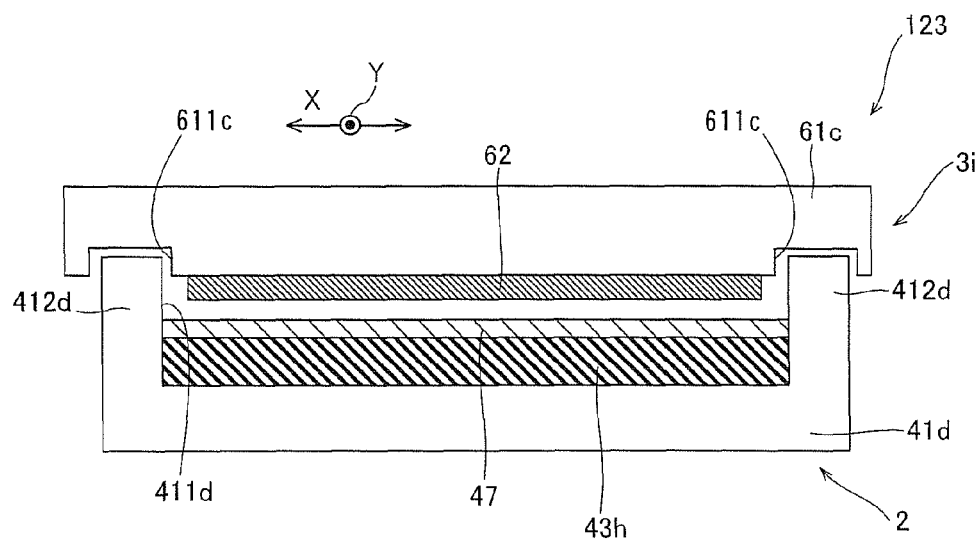
FIG. 62 A sectional view of an electrostatic induction power generating device according to a fourth modification of the first embodiment of the present invention.

While the example where the movable electrode portion 3 vibrates in the direction X is shown in the aforementioned first embodiment, the present invention is not restricted to this but recess portions 611c may be provided on a surface, opposed to a fixed electrode portion 2, of a movable substrate 61c as in a movable electrode portion 3i of an electrostatic induction power generating device 123 shown in FIG. 62, and a movable electrode portion 3i may be vibrated in a direction Y (perpendicular to the plane of paper) perpendicular to the direction X by moving projecting portions 412d of the fixed electrode 41d along the recess portions 611c.

Figure 63:
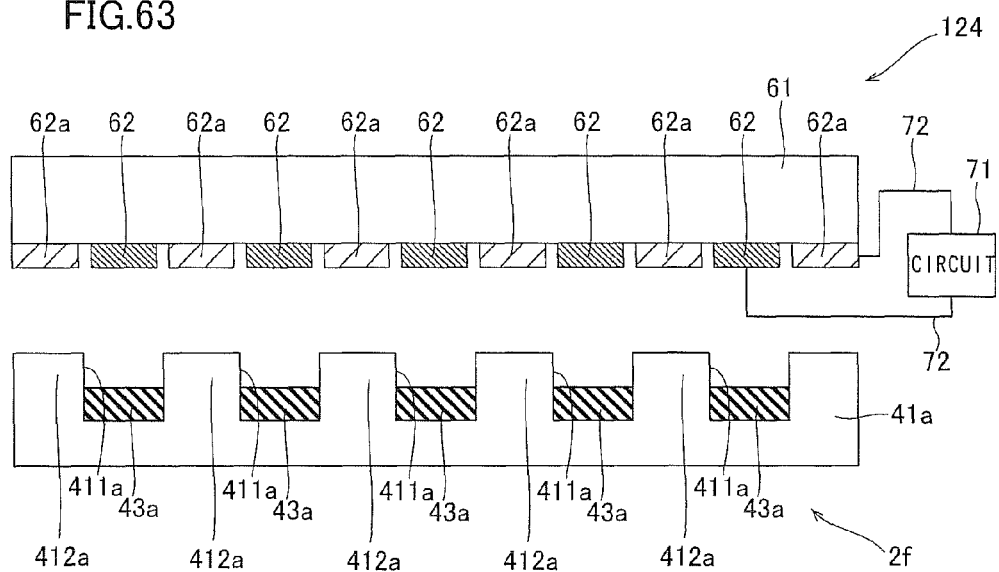
FIG. 63 A sectional view of an electrostatic induction power generating device according to a modification of the thirty-eighth embodiment of the present invention.

While the example of forming the protective film 63 on the surfaces of the movable substrate 7, the movable electrode 62 and the movable electrode 62a is shown in the aforementioned thirty-eighth, the present invention is not restricted to this but no protective film 63 may be formed as in an electrostatic induction power generating device 124 shown in FIG. 63. For example, a movable electrode portion 2f may be employed in a place of an electrode portion 2r.

Figure 64:
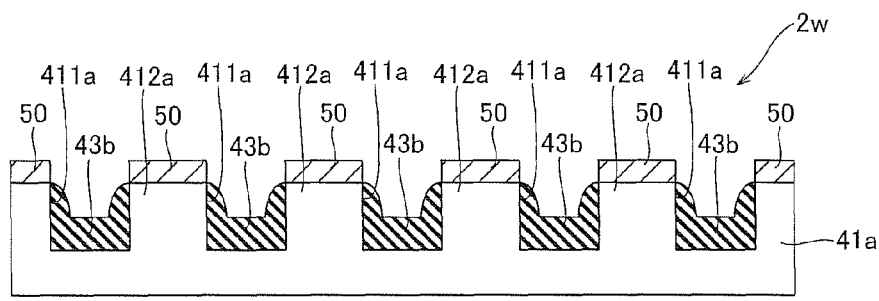
FIG. 64 A sectional view of a fixed electrode portion of an electrostatic induction power generating device according to a modification of the seventeenth embodiment of the present invention.

While the example of forming the stopper film 45a on the surface of the projecting portion 412a of the fixed electrode 41a is shown in the aforementioned seventeenth embodiment, the present invention is not restricted to this but a conductive layer 50 may be formed as in a fixed electrode portion 2w shown in FIG. 64. Thus, an electric field resulting from electric charges stored in electret films 43b formed to cover bottom surfaces of recess portions 411a of the fixed electrode 41a can be inhibited from reaching positions not opposed to main surfaces of the electret films 43b.

Figure 65:
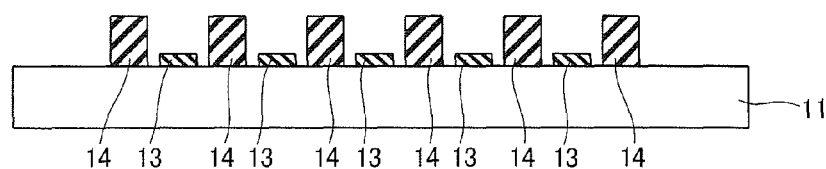
FIG. 65 A sectional view of a fixed electrode portion of an electrostatic induction power generating device according to a modification of each of the seventh to twelfth embodiments of the present invention.

While the example of forming the electret film on the surface of the fixed electrode is shown in each of the aforementioned seventh to twelfth embodiments, the present invention is not restricted to this but the electret film may be formed on a surface of a fixed substrate made of silicon as shown in FIG. 65.

While the electrostatic induction power generating device shown in each of the aforementioned first to forty-first embodiments may be applicable for a wrist watch, a thermometer, a temperature indicator, a passometer, a remote control, a portable audio player, a keyless entry, a hearing aid, a pacemaker, a laser pointer, an electric toothbrush, a sensor, an e-book, a cell-phone, a digital camera, a game console, a refrigerator, a washing machine, a dish dryer and a tire pressure sensor, for example.

While the example of applying each of the aforementioned first to forty-first embodiments of the present invention to the electrostatic induction power generating device as an electrostatic operation device, the present invention is not restricted to this but is also applicable to an electrostatic induction actuator, for example, other than the electrostatic induction power generating device.

The invention claimed is:

1. An electrostatic power generating device comprising:
a substrate;
a first electrode formed on a surface of said substrate;
a second electrode and an electret film so formed as to be opposed to said first electrode at an interval therebetween; and
a member inhibiting said first electrode and said electret film from moving close to each other within a prescribed interval, wherein
said electrostatic power generating device generates an electric power when at least one of said first electrode and said electret film moves in a direction parallel to the longitudinal direction of said substrate and a relative distance between said first electrode and said electret film changes,
said first electrode is interposed between said substrate and said electret film,
said member is held by one of said substrate or said second electrode,
said second electrode has a groove shaped recess portion and projecting portion provided on a surface of said second electrode, and
said electret film is so formed as to be embedded on a bottom surface of said recess portion of said second electrode and said electret film is not formed on a surface of said projecting portion.

2. The electrostatic power generating device according to claim 1, wherein
said electret film is formed on the bottom surface of said recess portion to have a thickness smaller than a depth of said recess portion.

3. The electrostatic power generating device according to claim 1, wherein
said electret film formed to be embedded in said groove shaped recess portion is oblongly formed in plan view.

4. An electrostatic power generating device comprising:
a substrate;
a first electrode formed on a surface of said substrate;
a second electrode and an electret film so formed as to be opposed to said first electrode at an interval therebetween; and
a member inhibiting said first electrode and said electret film from moving close to each other within a prescribed interval, wherein
said electrostatic power generating device generates an electric power when a relative position of said first electrode and said electret film moves at least in a horizontal direction,
said member is held by one of said substrate or said second electrode,
said second electrode has a groove shaped recess portion and projecting portion provided on a surface of said second electrode, and
said electret film is so formed as to be embedded on a bottom surface of said recess portion of said second electrode and said electret film is not formed on a surface of said projecting portion,
wherein said member is formed only on a surface of said projecting portion of said second electrode.

5. The electrostatic power generating device according to claim 1, wherein said first electrode comprises a plurality of electrodes.

6. The electrostatic power generating device according to claim 1, wherein said electret film comprises a plurality of electret portions.

* * * * *